United States Patent
Watson et al.

(10) Patent No.: US 10,645,029 B1
(45) Date of Patent: *May 5, 2020

(54) FAST RECONFIGURATION OF THE DATA PLANE OF A HARDWARE FORWARDING ELEMENT

(71) Applicant: Barefoot Networks, Inc., Palo Alto, CA (US)

(72) Inventors: Gregory C. Watson, Palo Alto, CA (US); Julianne Zhu, Los Gatos, CA (US); Ravindra Sunkad, Pleasanton, CA (US); Steven Licking, San Jose, CA (US); Sachin Bahadur, Santa Clara, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,513

(22) Filed: Aug. 21, 2017

Related U.S. Application Data

(60) Provisional application No. 62/474,004, filed on Mar. 20, 2017.

(51) Int. Cl.
*H04L 12/28* (2006.01)
*H04L 12/947* (2013.01)
(Continued)

(52) U.S. Cl.
CPC ........ *H04L 49/252* (2013.01); *G06F 13/1673* (2013.01); *G06F 13/287* (2013.01); *H04L 47/33* (2013.01)

(58) Field of Classification Search
CPC .......................... H04L 49/252; G06F 13/1673
See application file for complete search history.

(56) References Cited

U.S. PATENT DOCUMENTS

| 6,330,623 | B1 * | 12/2001 | Wu | .................. | G06F 13/28 |
| | | | | | 710/23 |
| 7,509,141 | B1 * | 3/2009 | Koenck | ............... | G06F 13/4256 |
| | | | | | 455/552.1 |

(Continued)

OTHER PUBLICATIONS

Author Unknown, "Cisco Catalyst 4500-X," Detailed Lab Testing Report, DR121129, Jun. 20, 2013, 60 pages, Miercom.

(Continued)

*Primary Examiner* — Parth Patel
(74) *Attorney, Agent, or Firm* — Compass IP Law PC

(57) ABSTRACT

Some embodiments of the invention provide a network forwarding element that includes a set of data plane circuits with several configurable packet processing stages for receiving and processing incoming packet traffic to the forwarding element. The forwarding element also includes a set of control plane circuits that include a set of direct memory access (DMA) buffers for configuring the configurable packet processing stages of the data plane. The control plane loads configuration data for reconfiguring the data plane packet processing stages into the set of DMA buffers while the data plane packet processing stages are processing the incoming packet traffic. The control plane pauses the incoming packet traffic to the data plane packet processing stages. The control plane loads the configuration data from the DMA buffers into the data plane packet processing stages. The control plane resumes the incoming packet traffic to the data plane packet processing stages.

19 Claims, 17 Drawing Sheets

(51) Int. Cl.
*G06F 13/16* (2006.01)
*H04L 12/801* (2013.01)
*G06F 13/28* (2006.01)

(56) References Cited

U.S. PATENT DOCUMENTS

| | | | | |
|---|---|---|---|---|
| 8,161,214 | B2* | 4/2012 | Yoon | G06F 13/28 |
| | | | | 710/30 |
| 9,509,639 | B1* | 11/2016 | Kadosh | H04L 49/3063 |
| 9,531,647 | B1* | 12/2016 | Goyal | H04L 67/325 |
| 9,569,372 | B2* | 2/2017 | Diamant | G06F 3/0607 |
| 10,063,407 | B1* | 8/2018 | Kodeboyina | H04L 41/0654 |
| 10,158,573 | B1* | 12/2018 | Lee | H04L 47/125 |
| 10,164,829 | B1* | 12/2018 | Watson | G06F 13/385 |
| 2006/0155880 | A1* | 7/2006 | Elnozahy | H04L 49/351 |
| | | | | 710/1 |
| 2007/0253438 | A1* | 11/2007 | Curry | H04L 47/10 |
| | | | | 370/412 |
| 2012/0008768 | A1* | 1/2012 | Mundra | H04L 9/0637 |
| | | | | 380/28 |
| 2012/0011351 | A1* | 1/2012 | Mundra | G06F 21/72 |
| | | | | 713/1 |
| 2014/0247751 | A1 | 9/2014 | Sonoda et al. | |
| 2014/0254594 | A1* | 9/2014 | Gasparakis | H04L 45/74 |
| | | | | 370/392 |
| 2015/0113184 | A1* | 4/2015 | Stanford-Jason | |
| | | | | G06F 13/4286 |
| | | | | 710/106 |
| 2015/0169418 | A1* | 6/2015 | Cardona | G06F 11/2033 |
| | | | | 714/4.11 |
| 2015/0249565 | A1 | 9/2015 | Yamabe et al. | |
| 2015/0261686 | A1* | 9/2015 | Nampoothiri | G06F 13/28 |
| | | | | 710/308 |
| 2015/0288595 | A1 | 10/2015 | Suzuki | |
| 2016/0011996 | A1* | 1/2016 | Asaad | G06F 15/76 |
| | | | | 710/308 |
| 2016/0154756 | A1* | 6/2016 | Dodson | G06F 13/4022 |
| | | | | 710/316 |
| 2016/0174198 | A1 | 6/2016 | Akiyoshi et al. | |
| 2017/0099675 | A1* | 4/2017 | Gineste | H04W 72/1263 |
| 2017/0177520 | A1* | 6/2017 | Kampe | G06F 13/28 |
| 2017/0222881 | A1* | 8/2017 | Holbrook | H04L 43/0876 |
| 2017/0251077 | A1* | 8/2017 | Kumar Eerpini | H04L 67/327 |
| 2017/0257309 | A1* | 9/2017 | Appanna | H04L 45/245 |
| 2018/0026916 | A1* | 1/2018 | Banerjee | H04L 47/30 |
| | | | | 370/412 |
| 2018/0091376 | A1* | 3/2018 | Ramakrishna | H04L 41/142 |
| 2018/0095677 | A1* | 4/2018 | Chrobak | G09G 5/001 |

OTHER PUBLICATIONS

Author Unknown, "In-Service Software Upgrade (ISSU)," Date Unknown but prior to Mar. 20, 2017, 1 page, Cisco Systems, Inc., https://www.cisco.com/c/en/us/products/ios-nx-os-software/in-service-software-upgrade-issu/index.html.

Jin, Xin, et al., "Dynamic Scheduling of Network Updates," SIGCOMM'14, Aug. 17-22, 2014, 12 pages, ACM, Chicago, IL, USA.

Non-published commonly owned U.S. Appl. No. 15/682,515, filed Aug. 21, 2017, 45 pages, Barefoot Networks, Inc.

Office Action for U.S. Appl. No. 16/219,921, dated Sep. 6, 2019, 8 pages.

* cited by examiner

US 10,645,029 B1

FAST RECONFIGURATION OF THE DATA PLANE OF A HARDWARE FORWARDING ELEMENT

CLAIM OF BENEFIT TO PRIOR APPLICATIONS

This Application claims the benefit of U.S. Provisional Patent Application 62/474,004, filed Mar. 20, 2017. The contents of U.S. Provisional Patent Application 62/474,004 are hereby incorporated by reference.

BACKGROUND

Network forwarding elements commonly have control and data plane components. The control plane component provides an interface for configuring the data plane component. The data plane component handles the forwarding of the data packets that the forwarding element receives. There are many situations where the data plane component of a forwarding element has to be reconfigured. For instance, the data plane component may need to be upgraded to utilize a new encapsulation method. The data plane components of a forwarding element are typically in an integrated circuit (IC). The users of the existing forwarding elements have to wait several years for the release of a new IC that supports the new encapsulation method.

As another example, the data plane component of the forwarding element may wedge. A cold reboot of the data plane component may take several seconds and cause a large impact to the incoming packet traffic. There are currently no practical ways of reconfiguring the data plane component of a forwarding element with minimal impact to the incoming traffic.

SUMMARY

Some embodiments of the invention provide a forwarding element with a data plane that can be configured by the control plane of the forwarding element through direct memory access (DMA). The data plane includes a set of configurable ingress pipelines, a set of configurable egress pipelines, and a configurable traffic manager that provides a switching fabric between the ingress and egress pipelines.

The control plane of the forwarding element in some embodiments provides an interface for reconfiguring the data plane. The control plane loads configuration data for reconfiguring the data plane into a set of DMA buffers while the data plane is processing the incoming packets. The control plane then pauses the incoming packets to the ingress pipelines of the data plane.

The control plane then commands the DMA buffers to load configuration data into the data plane to reconfigure one or more reconfigurable components of the data plane. Each ingress and egress pipeline of the forwarding element includes several match-action units (MAUs). Each MAU has a match sub-unit and an action sub-unit. The match sub-unit compares one or more fields of a received packet to identify flow entries in one or more match tables, while the action sub-unit performs the action or actions of the identified flow entries.

The roles and/or the sizes of the tables in match sub-units are reconfigurable after the forwarding element is deployed in the field. Reconfiguring the data plane in some embodiments includes reconfiguring one or more tables of the match action sub-units to change the role of these tables, to change the data loaded in the tables, or both. For instance, a table that was used as a route table before reconfiguration may be reconfigured as a port table. The size of the tables may also be reconfigured to include more or less data items.

Once the data plane components are reconfigured through the DMA, the control plane restarts the flow of the incoming packets into the ingress pipelines of the data plane. The IC chip of the forwarding element is repurposed in the field with minimum impact to the processing of the incoming packet traffic.

Some embodiments allow the packets that have already entered the pipelines to be processed before commanding the DMA buffers to load the configuration data into the data plane components. Other embodiments process the current packet in each pipeline and drop other packets in the pipelines before the DMA buffers are loaded into the data plane components.

In some embodiments, the control plane enables buffering of the incoming packets while the data plane is reconfigured. In these embodiments, the buffered packets are processed after the reconfiguration is completed and then resumes processing the new arriving packets.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Fast Reconfiguration of the Data Plane

Some embodiments of the invention provide a forwarding element with a data plane that is configured by the control plane of the forwarding element through direct memory access (DMA). DMA is used to transfer data from one memory location or resource to another memory location or resource without using a device's processor during the transfer. DMA allows a processor to load data in one or more DMA buffers, and construct a descriptor that defines source, destination, and amount of data to transfer. For instance, the descriptor may include the starting address of a DMA buffer, the address of the destination, and the length of data to transfer in number of blocks. The transfer of data is performed by a DMA engine (or controller) without the use of the processor.

Figure 1:
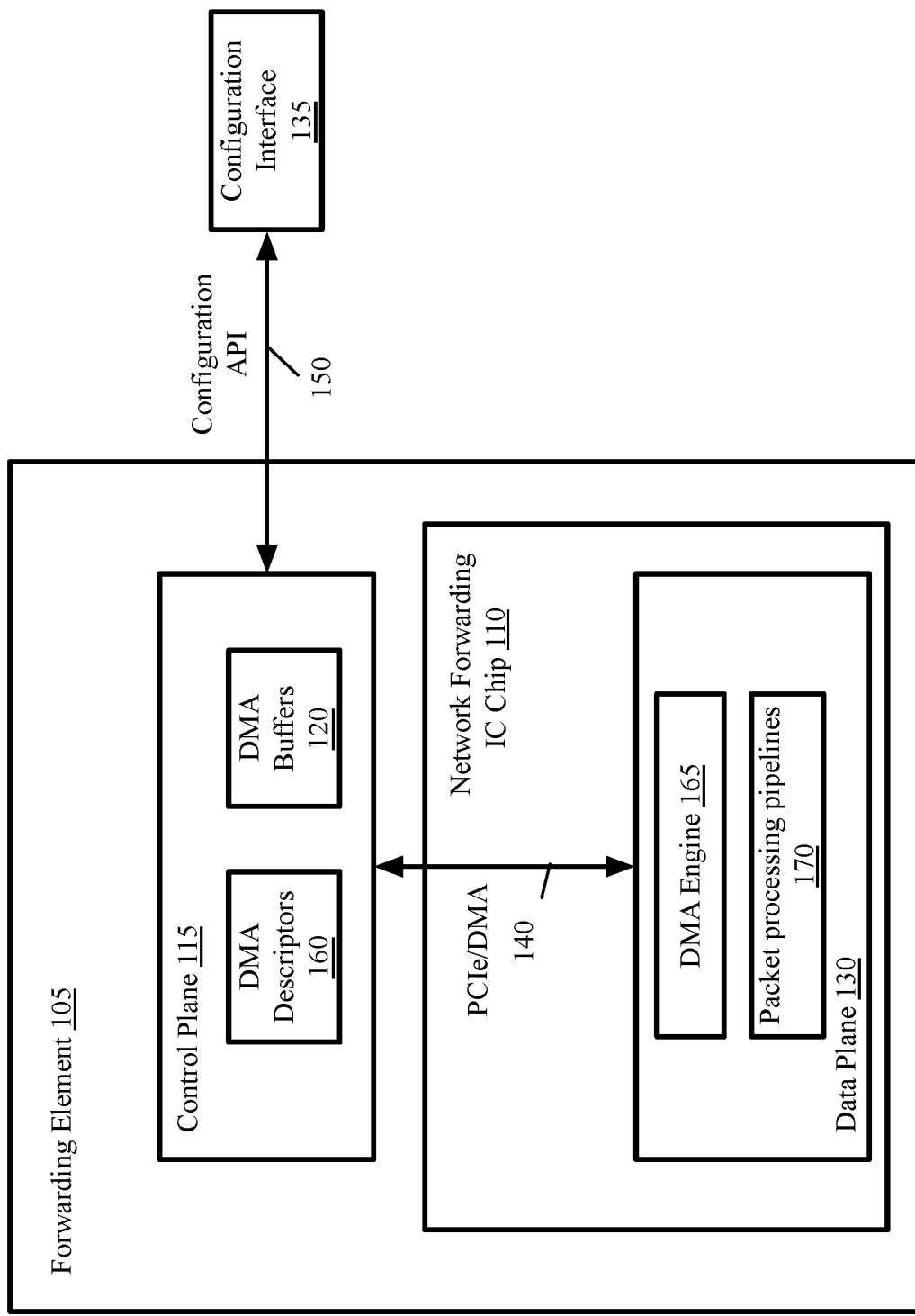
FIG. 1 conceptually illustrates an example of a network forwarding element that can be reconfigured through DMA in some embodiments.

FIG. 1 conceptually illustrates an example of a network forwarding element 105 with a data plane that can be reconfigured through DMA. The network forwarding element 105 can be any type of forwarding element in a network, such as a switch, a router, a bridge, etc., or any type of middlebox appliance in the network.

As shown, the forwarding element 105 includes a network forwarding IC chip 110. The forwarding IC chip 110 in some embodiments is a semiconductor chip (e.g., a chip that includes one or more IC wafers) that is used in the network forwarding element 105 to forward data packets received by the network forwarding element to the data packet destinations (e.g., to computers connected to the forwarding element or to other network forwarding elements). The network forwarding element 105 is a standalone network forwarding element (e.g., a standalone hardware network switch or router), or a forwarding element that is part of a computer (e.g., is incorporated in a network interface card of a computer).

As further shown, the network forwarding element 105 includes control-plane forwarding circuits ("control plane") 115 and data-plane circuits ("data plane") 130. The control plane of the forwarding element communicates with a configuration interface 135 through an application programming interface (API) 150 to receive configuration data to reconfigure the data plane 130. The control plane loads configuration data for reconfiguring the data plane into a set of DMA buffers 125.

The control plane and the data plane in some embodiments communicate through a PCI Express (peripheral component interconnect express or PCIe) bus 140. The control plane also includes DMA descriptors 160, which are memory locations that are dynamically programmed to include the starting address of each DMA buffer to load into data plane, the destination address in the data plane to receive the contents of the DMA buffer, and the number of bytes to transfer. The DMA descriptors, therefore, store control information while DMA buffers store data information. In some embodiments, the descriptors are chained together such that at the end of a DMA transfer from a DMA buffer, a DMA transfer from another DMA buffer is automatically started.

Some embodiments utilize registers instead of memory-based descriptors to store the starting address of each DMA buffer to load into the data plane, the destination address in the data plane to receive the contents of the DMA buffer, and the number of bytes to transfer. The content of the DMA buffers in some embodiments are transferred to the data plane through the PCIe bus. In other embodiments, a dedicated DMA channel (not shown) that is separate from the PCIe bus is used for DMA transfer.

Data plane 130 includes one or more packet processing pipelines 170. The data plane also includes a DMA engine 165 that facilitates transfer of DMA data into different configurable components of the packet processing pipelines 170. As described further below, the control plane loads the configuration data into the DMA buffers while the data plane is processing the incoming packets.

Figure 2:
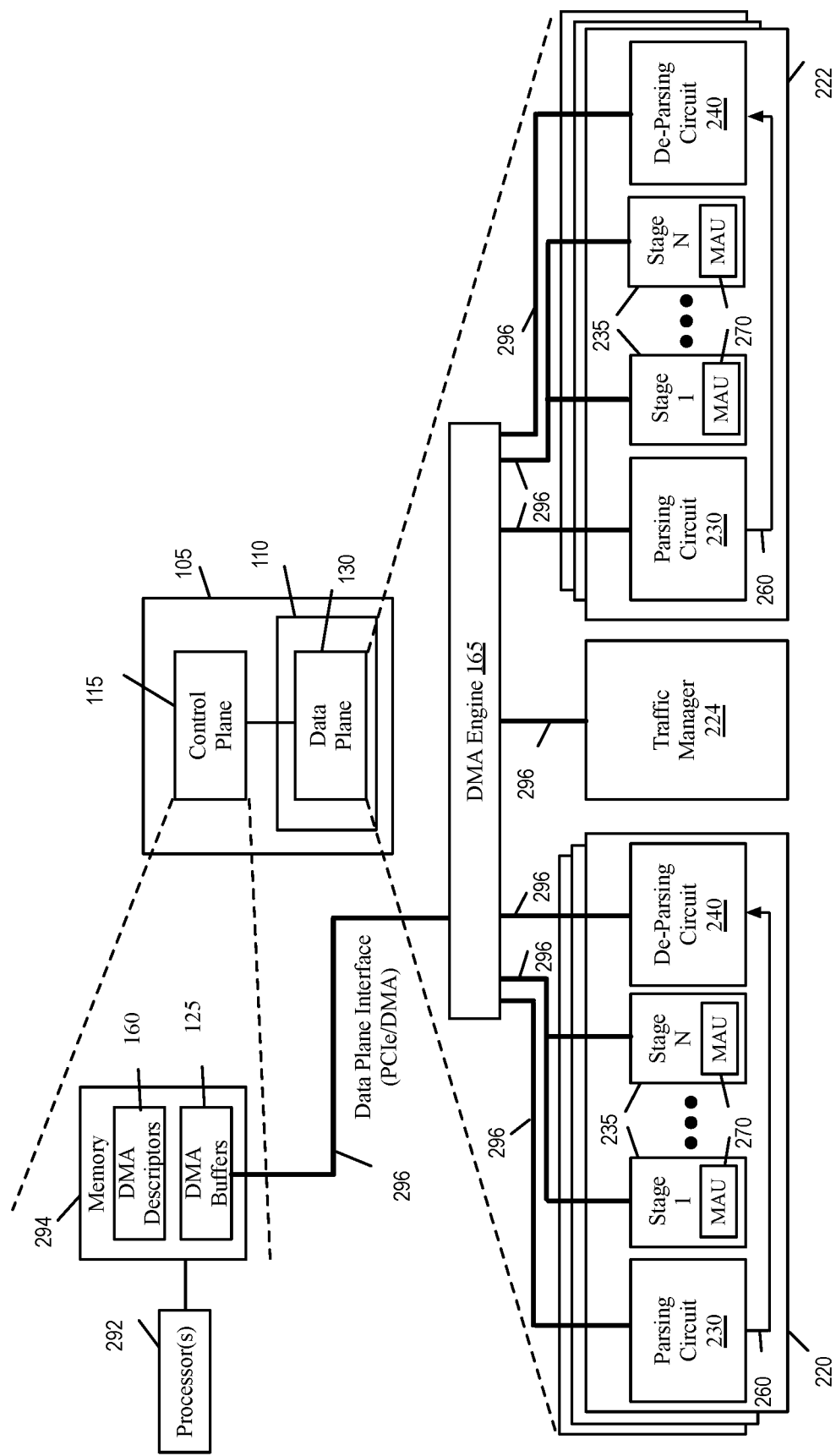
FIG. 2 conceptually illustrates further details of a network forwarding element in some embodiments.

FIG. 2 conceptually illustrates further details of a network forwarding element 105 in some embodiments. As shown, the network forwarding element 105 is a physical (i.e., hardware) forwarding element that includes control-plane circuits 115 and a network forwarding IC chip 110 with data-plane forwarding circuits 130. The figure shows an expanded view of the data plane and an expanded view of the control plane (as conceptually shown by the dashed line). The data-plane forwarding circuits 130 include several parallel ingress pipelines 220, several parallel egress pipelines 222, and a traffic manager 224. Each of the pipelines 220 and 222 includes a parsing circuit 230, multiple data processing stages 235, and a de-parsing circuit 240.

In some embodiments, the data plane 130 processes data tuples associated with packets (i.e., the data messages) received by the IC chip. When the forwarding IC chip 110 receives a packet, the packet is directed to an ingress pipeline 220. In some embodiments, different ingress and egress pipelines are associated with different physical ports of the network forwarding IC chip. The parsing circuit 230 of the ingress pipeline 220 that receives a packet (1) parses the headers of the packet and (2) generates a set of data tuples for each received packet for the data plane's data processing stages to process. Each data tuple set is referred to as a header vector, as typically the parsing circuit separates a data packet's header from its payload, defines a header vector from the header, and passes the payload along another path 260 (that does not traverse through the ingress pipeline's data processing stages 235) to the de-parser 240 of the ingress pipeline.

The parsing circuit 230 of the ingress pipeline passes each header vector that it generates to the first data processing stage 235. In some embodiments, each header vector then sequentially passes through each of the data processing stages 235 of the ingress pipeline until it reaches the de-parser 240 of this pipeline. In some embodiments, each data processing stage includes a match-action-unit (MAU) 270. Each MAU has a match sub-unit and an action sub-unit. The match sub-unit compares one or more fields of a received packet to identify flow entries in one or more match tables, while the action sub-unit performs the action or actions of the identified flow entries. The traffic manager includes ingress queues, egress queues and a hardware switching fabric between the ingress and egress queues.

Each stage's MAU searches one or more tables to identify records that match a header vector (i.e., to perform lookups based on the header vectors) and performs actions based on the matching records (i.e., performs actions based on the lookups). In some embodiments, an MAU includes a sequence of stages, with each stage including one or more match tables and an action engine. Each match table includes a set of match entries against which the header fields are matched (e.g., using hash tables), with the match entries referencing action entries. When the header vector matches a particular match entry, that particular match entry references a particular action entry that specifies a set of actions to perform on the header vector (e.g., sending the packet to a particular port, modifying one or more header field values, dropping the packet, mirroring the packet to a mirror buffer, etc.). The action engine of the stage performs the actions on the header vector, which is then sent to the next stage of the MAU.

The de-parser 240 reconstructs the packet using the header vector received from the last data processing stage 235 (as modified by the data processing stages 235) and the payload received directly from the parsing circuit 230. In some embodiments, the de-parser constructs a packet that can be sent out onto the wire. The de-parser of the ingress pipeline provides the packet that it reconstructs to the traffic manager 224.

After passing through the selected ingress pipeline 220, a packet arrives at the traffic manager 224. The traffic manager includes queues that store the packets (including their associated header vectors) and the network forwarding IC's switching fabric that acts as a crossbar switch that dispatches the packet to one of the egress pipelines 222. The traffic manager's switching fabric allows the traffic manager 224 to direct a packet that is received along an ingress pipeline associated with a physical port that received the packet, to an egress pipeline associated with the same or different physical port that needs to transmit the packet.

Once the traffic manager dispatches the packet to an egress pipeline 222, the packet is processed in the same fashion as described above for the ingress pipeline 220. In other words, the egress pipeline's parsing circuit extracts a header vector from the packet, passes this header vector to the data processing stages 235 of its pipeline, and passes the packet's payload to the pipelines de-parser 240. The data processing stages sequentially process the header vector and provide this header vector to the de-parser to reconstitute the packet (when the packet does not get dropped) to transmit along one of the physical ports.

In some embodiments, ingress pipeline 220, traffic manager 224, and egress pipeline 222 of the data plane 130 include several components that are accessible through the DMA and can be configured (or reconfigured) after the IC chip 110 is deployed in the field. The IC chip in some embodiments can be reconfigured by pausing the packet traffic to the ingress pipeline 220, loading configuration data into one or more configurable components of the data plane, and resuming the packet traffic to the ingress pipeline.

The data plane further includes a DMA engine 165 that performs DMA data transfer to different components (or blocks) in the data plane. Some embodiments include one PCIe channel 296 between the control plane and the data plane. Inside the data plane there are several separate configurable blocks (e.g., parsing circuits, MAUs, or de-parsing circuits in each ingress or egress pipeline, the traffic manager, etc.) and each configurable block is accessible by a separate DMA channel (as shown by the bolded lines 296 in the data plane).

The control plane 115 configures the data plane forwarding circuits 130. In some embodiments, the control plane includes one or more processors 292 (such as a microprocessor with multiple processing cores or units) that execute instructions and a memory 294 that stores instructions. These instructions can be specified by (1) a manufacturer of the network forwarding element 105 that uses the forwarding IC chip 110, (2) a network administrator that deploys and maintains the network forwarding element 105, or (3) one or more automated processes that execute on servers and/or network forwarding elements that monitor network conditions.

The memory also includes a set of DMA buffers 125 and a set of DMA descriptors 160. The DMA buffers in some embodiments may be physically separate than the rest of the memory 294. A processor 292, or another circuit of the control plane, communicates with the data plane (e.g., to configure the data plane or to receive statistics from the data plane) through a data plane interface 296 (e.g., an interface that includes a PCIe interface).

The processor saves the starting address of each DMA buffer, the destination address where the data has to be transferred, and the number of bytes to transfer for each DMA transfer in a set of descriptors 160. DMA buffers 125 store the actual data to transfer to the configurable components of the data plane. For instance, each descriptor saves a pointer to the start of a DMA buffer, the address of the destination in the data plane, and the length of data to transfer. Some embodiments use a different DMA buffer for each configurable component of the data plane.

Figure 3:
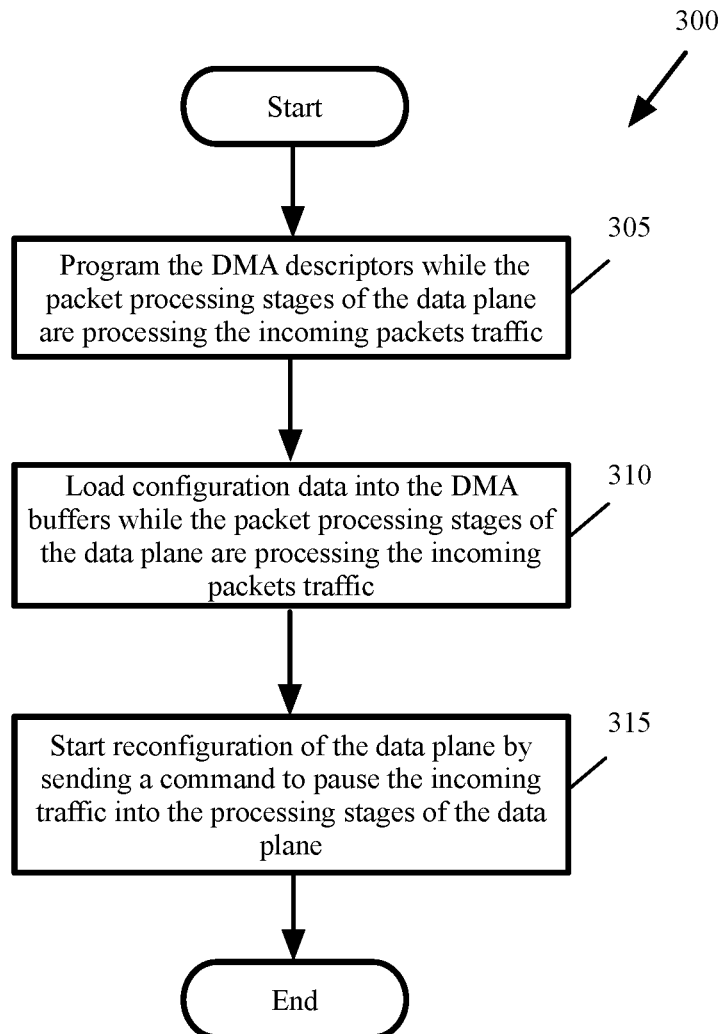
FIG. 3 conceptually illustrates a process for reconfiguring the data plane of a forwarding element in some embodiments.

FIG. 3 conceptually illustrates a process 300 for setting up DMA buffers to reconfigure the data plane of a forwarding element in some embodiments. The process in some embodiments is performed by software executed by processor 292 in the control plane 115 shown in FIG. 2. As shown, the process programs (at 305) the DMA descriptors while the packet processing stages of the data plane are processing the incoming packets traffic. For instance, processor 292 programs DMA descriptors 160 shown in FIG. 2.

The process also loads (at 310) the configuration data into the DMA buffers while the packet processing stages of the data plane are processing the incoming packets traffic. For instance, the processor 292 loads configuration data into DMA buffers 215 in FIG. 2 while the ingress pipelines 220 of the data plane 130 are receiving the incoming packets and parsing circuits 230, processing stages 235, de-parsing circuits 240, and traffic manager 224 of the data plane are processing the packets. Configuration data may be received through a set of APIs 150 from a configuration interface 135 shown in FIG. 1. Configuration data may also be generated by the processor 292 or retrieved from memory 294 shown in FIG. 2.

The process then sends (at 315) a command to the data plane to halt the incoming traffic to the packet processing stages of the data plane. For instance, the control plane sends a DMA instruction to the parsing circuits of the ingress pipeline to stop receiving incoming packets and/or to pause the delivery of the incoming packets to the processing stages 235. The process then ends. The DMA instruction in some embodiments is programmed into a DMA descriptor, which is the first descriptor that is used to start the DMA transfer.

Some embodiments perform a delay after pausing the traffic and before loading data from DAM buffers into the data plane to allow the packets that have already entered the pipelines to be processed before commanding the DMA buffers to load the configuration data into the data plane components. Other embodiments, process the current packet in each pipeline and drop other packets in the pipeline before the DMA buffers are loaded into the data plane components. In some embodiments the delay is implemented by making a pause in the chain of descriptors after DMA instruction to halt incoming packets is loaded in the parsing circuits of the ingress pipeline of the data plane.

Figure 4:
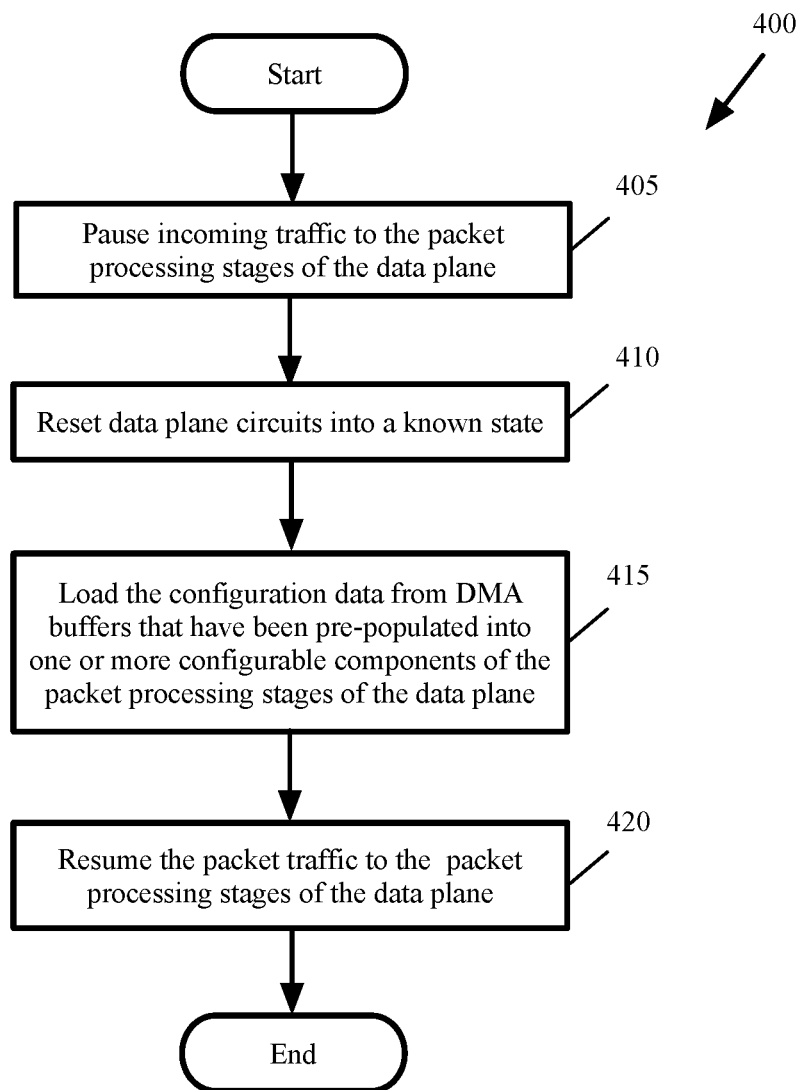
FIG. 4 conceptually illustrates a process for fast reconfiguration of the data plane through DMA in some embodiments.

FIG. 4 conceptually illustrates a process 400 for fast reconfiguration of data plane through DMA in some embodiments. The process in some embodiments is performed by the DMA engine 165 shown in FIG. 2 using the contents of DMA buffers transferred from the control plane into the configurable components of the data plane.

As shown, the process pauses (at 405) incoming traffic into the packet processing stages of the data plane. For instance, as a result of receiving DMA instruction from process 300 to pause the incoming traffic, a set of instructions is loaded into parsing circuits 230 of the ingress pipeline 220 in FIG. 2 to pause receiving the incoming packets and/or to pause delivery packets to the processing stages 235 and the departing circuits 240 of the data plane.

The process then resets (at 410) the data plane circuits in a know state. For instance, the data plane portion of the IC network forwarding IC chip 110 is reset to a known state by setting or resetting one or more command lines in the chip. The process then loads (at 415) the configuration data from DMA buffers into one or more configurable components of the packet processing stages of the data plane. For instance, the process loads configuration data from the DMA buffers 215 in FIG. 2 into one or more match tables of MAU stages 270, into one or more action units of the MAU stages 270, or into one or more queues of the traffic manager 224 (e.g., to reset the queues).

The process then resumes (at 420) the flow of packet traffic to the packet processing stages of the data plane. For instance, the last DMA buffer transfer causes the data plane to resume receiving and processing the packets. The process then ends. Since all configurable components of the data plane are DMA accessible, the reconfiguration is performed very fast and in most scenarios can be done in less than 100 milliseconds. As an example, it will take less then 40 milliseconds for a total of 100 MB of DMA data transfer through a PCIe link with a bandwidth of 3 GB to the data plane.

The fast reconfiguration of the data plane after the forwarding IC is deployed in the field provides the advantage that the user of the forwarding element can upgrade the data plane program with minimum impact to the packet traffic. The user also does not have to wait for a new release of the forwarding IC chip that may take several years to design and fabricate. Instead, the data plane is reprogrammed in a matter of a few milliseconds to support the new features or the new policy intent. In contrast to most physical network chips where the MAU tables are pre-assigned functionality, the design of the forwarding IC in the embodiments of the invention is flexible and functionality and the size of the data plane tables can be reprogrammed.

Using Fast Reconfiguration as a Primitive to Perform Fast Reboot

Process 400 for fast reconfiguration of the data plane is used as a hardware primitive in some embodiments. The fast reconfiguration primitive in some embodiments is started as an API call that activates a chain of DMA descriptors. The API to start fast reconfiguration is stored in an API library.

In some of these embodiments, the fast reconfiguration primitive is not exposed to the users of the forwarding IC chip. Instead, the primitive is used in other library functions and constructs. The hardware primitive is used to pause packet traffic into the data plane, reset the data plane circuits, reconfigure the data plane components, and restart packet traffic in a short time with minimal impact to the incoming packet traffic. For instance, some embodiments perform the fast reconfiguration of the data plane in 100 milliseconds to 200 milliseconds depending on the bandwidth of the PCIe bus.

An example of a use case for the fast reconfiguration of the data plane is the use of the hardware primitive to perform fast (or warm) reboot of the data plane with minimum impact to the incoming packet traffic. For instance, fast reboot can be initiated by an application executing in the control plane of the forwarding element when the forwarding element is wedged and performs a sub-set of its functions but is not able to completely function as expected.

Other examples of the use of fast reboot include upgrading different drivers in the data plane, forwarding element maintenance, and an application crash. Yet other examples of the need for reconfiguring the data plane include a change in the network topology, a change in the policy intent for the forwarding element, an update to the data plane program to support a new feature such as a new encapsulation method, etc.

Fast reboot makes calls to different APIs to populate DMA buffers and to program the associated descriptors. Examples of such API calls include calls to different drivers to add a VLAN (virtual local area network), to add a route, to add a MAC (media access control) address, etc. Each driver translates the corresponding call into a set of operations to load one or more DMA buffers with configuration data to reconfigure the data plane in order to perform the function provided by the API call.

Loading the DMA buffers may take several seconds or even several minutes while the data plane is still receiving and processing packets. Once all DMA buffers are populated, fast reconfiguration of data plane is started by an API call that activates the hardware primitive. Fast reconfiguration ends by re-enabling the ingress parsing circuitry to allow incoming packets into the packet processing stages of the data plane.

Figure 5:
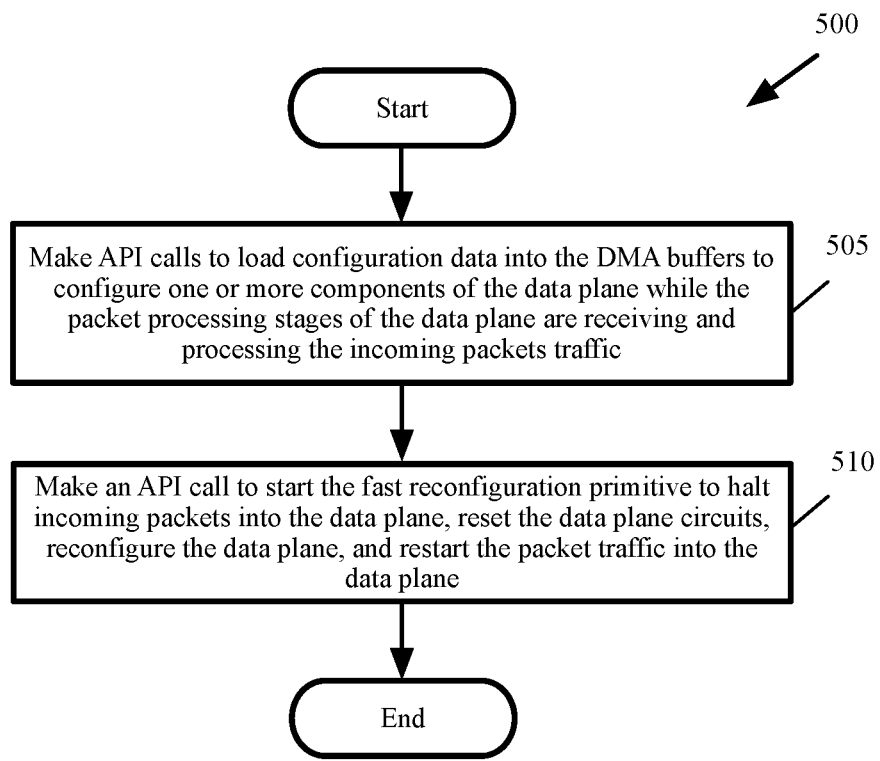
FIG. 5 conceptually illustrates a process that utilizes the fast reconfiguration primitive to reconfigure one or more components of the data plane in some embodiments.

FIG. 5 conceptually illustrates a process 500 that uses the fast reconfiguration primitive to reconfigure one or more components of the data plane in some embodiments. FIG. 5 is described by reference to FIGS. 6A-6C that conceptually illustrate reconfiguring of one or more components of the data plane of a forwarding IC in some embodiments.

Figure 6A:
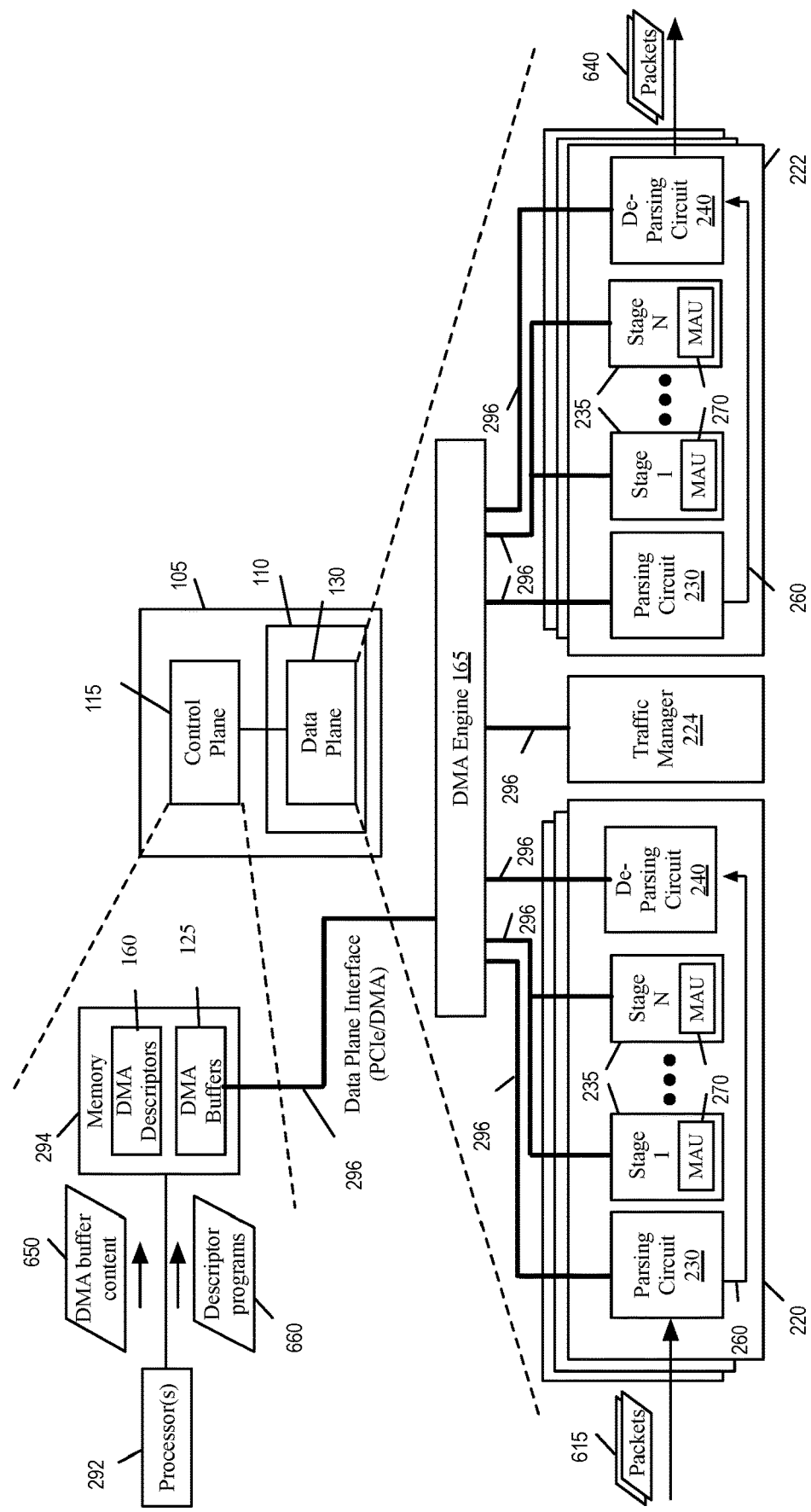
FIGS. 6A-6C conceptually illustrate reconfiguring of one or more components of the data plane of a forwarding IC in some embodiments.
Figure 6B:
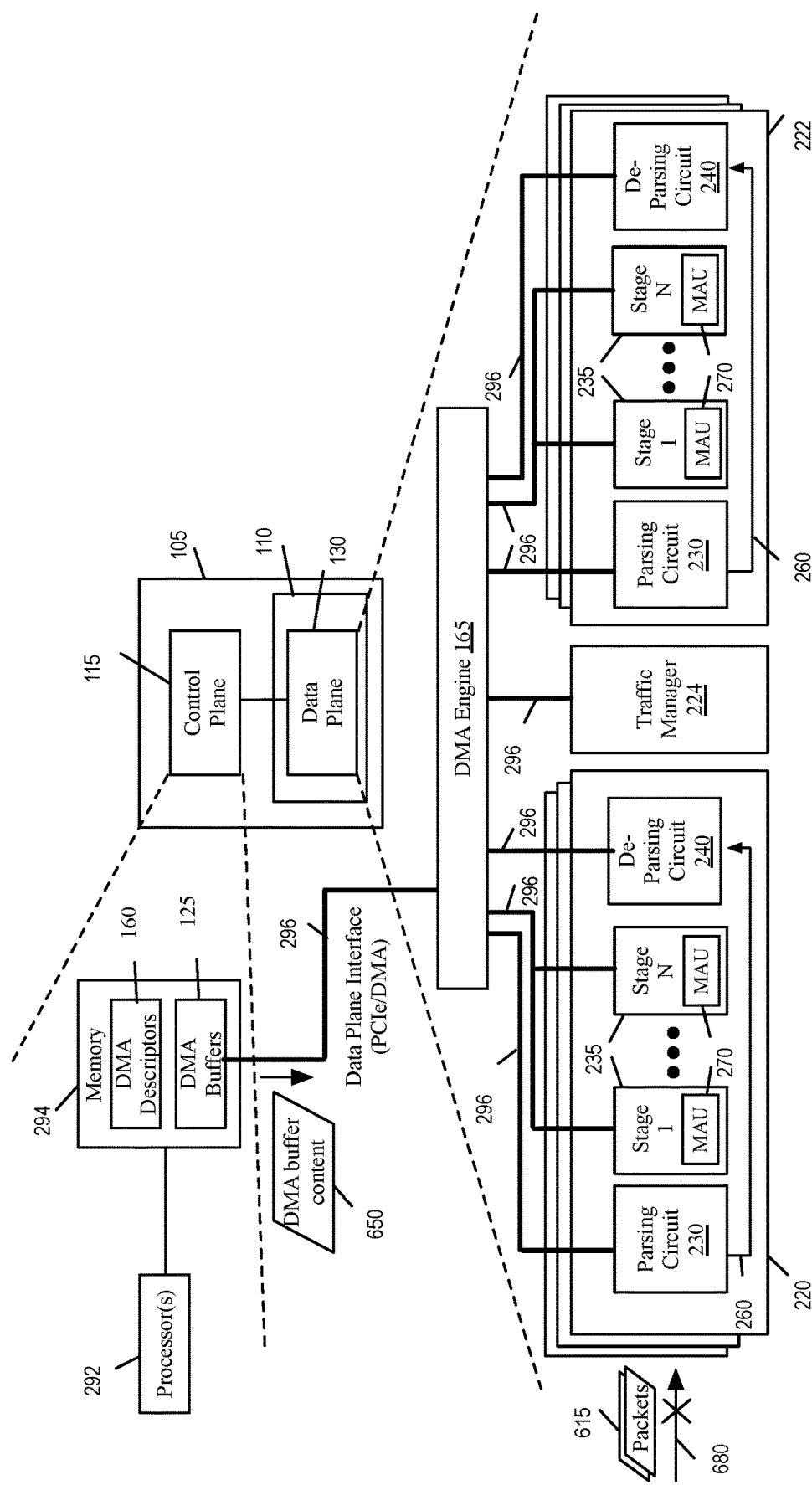
Figure 6C:
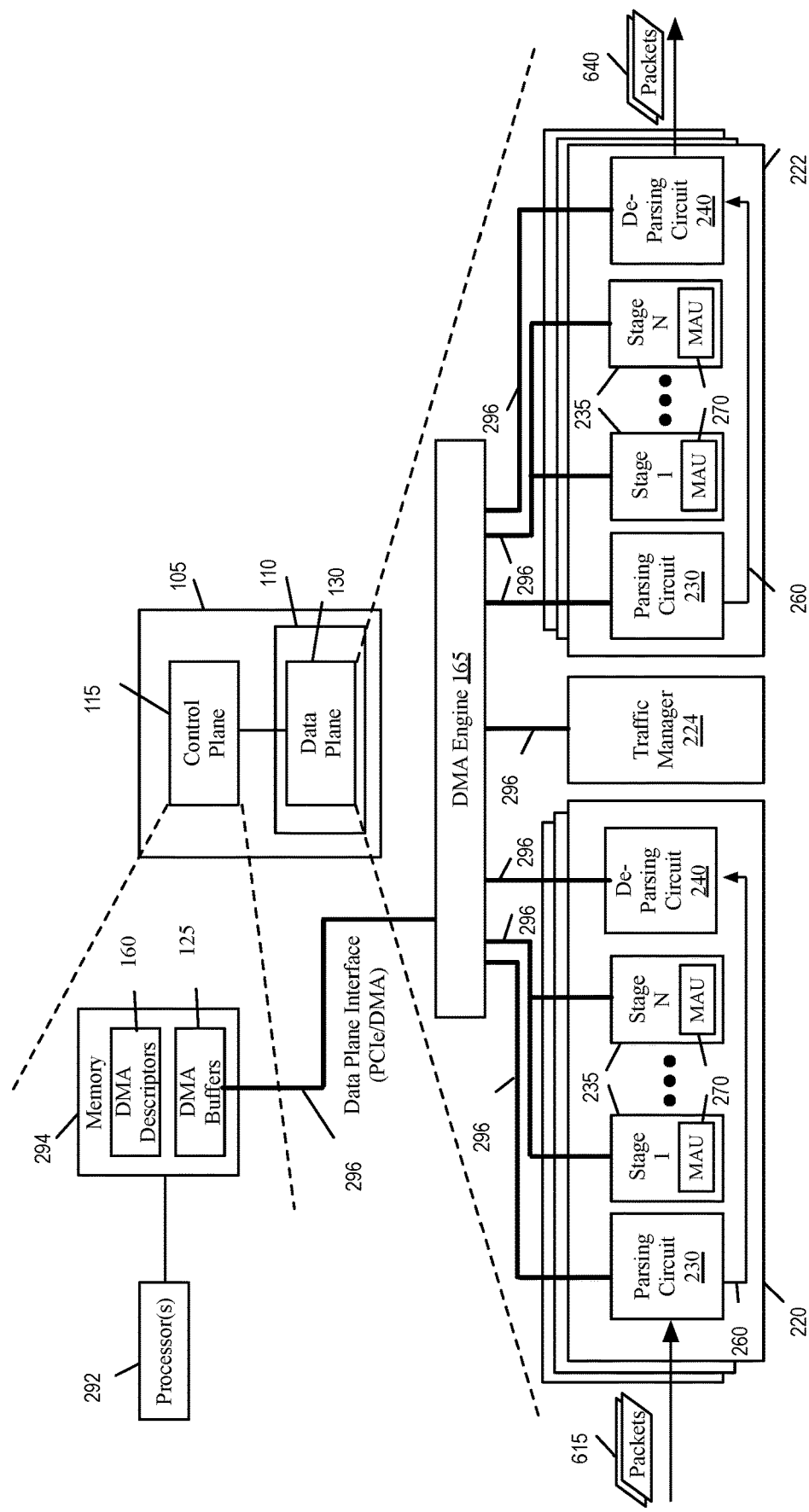

Process 500 in some embodiments is performed by an application that executes by a processing unit such as processor 292 in the control plane 115 of a forwarding element 105 as shown in FIGS. 6A-6C. As shown, process 500 makes (at 505) several API calls to load configuration data into the DMA buffers to configure one or more components of the data plane while the packet processing stages of the data plane are receiving and processing the incoming packet traffic.

In FIG. 6A, an application such as fast reboot that executes on one or more processing units (292) in the control plane makes one or more API calls to different drivers to reconfigure one or more components of the data plane. The drivers program one or more descriptors 160 (as shown by 660) and load the associated DMA buffers (as shown by 650) by content to copy into the data plane components using DMA.

As shown in FIG. 6A, while the descriptors 160 are programmed and the DMA buffers 125 are loaded, incoming packets 615 are received at the parsing circuits 230 of the ingress pipelines 220. The output packets 640 are also sent out of the egress pipelines 222.

Once the descriptors are programmed and the DMA buffers are loaded, process 500 makes (at 510) an API call to start the fast reconfiguration primitive. The fast reconfiguration primitive causes the content of DMA buffers to be loaded into their destinations (as described by the corresponding descriptors). The fast reconfiguration primitive pauses the incoming packet traffic into the data plane processing stages, resets the data plane circuits into a known (or default) state, and reconfigures the data plane circuits by loading the DMA buffers into the destinations.

As shown in FIG. 6B, the incoming packet traffic 615 into the processing stages of the data plane is stopped (as shown by 680) while the contents 650 of one or more DMA buffers 125 are loaded into the data plane through the data plane interface 296 (e.g., the PCIe bus). As shown, packets are not processed and/or sent out of the data plane egress pipelines 222 during this stage. The operations of the processing units 292 of the control plane are not stopped during the reconfiguration of the data plane.

Once the configuration data is loaded into the destination locations in the data plane, the packet traffic into the data plane is restarted. As shown in FIG. 6C, once the configuration data is loaded into the data plane components, the parsing circuits 230 resume sending the incoming packet traffic 615 into the packet processing stages 235 of the data plane. For instance, the last DMA buffer that is loaded into the data plane is loaded into the ingress pipelines parsing circuits to enable the parsing circuits to resume sending the packets into the processing stages of the data plane. As shown, the egress pipelines 222 send the egress packets 640 out of the forwarding element 105.

II. Incremental Update of the Data Plane

Figure 7:
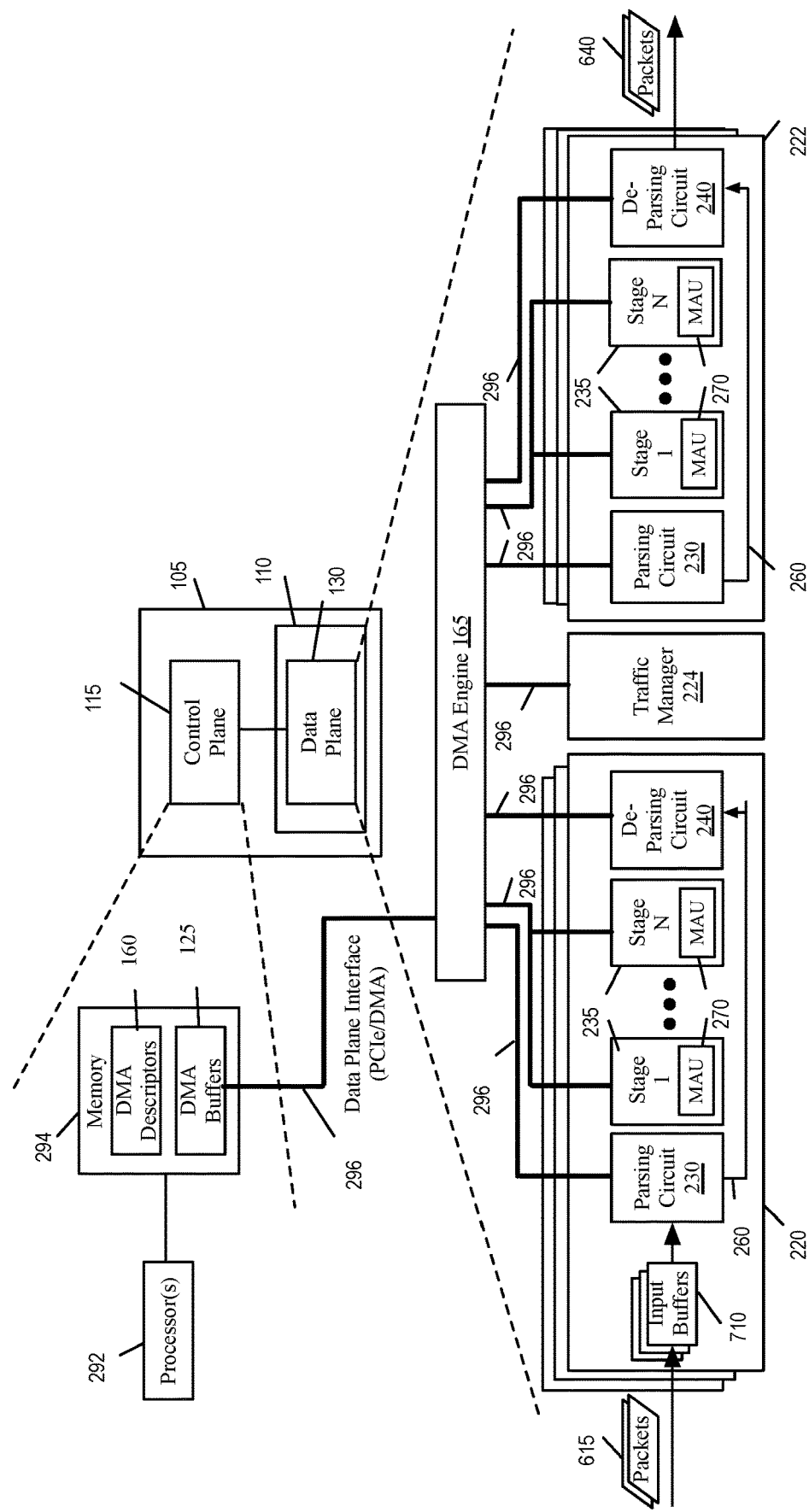
FIG. 7 conceptually illustrates incremental update of data plane program in a network forwarding element in some embodiments.

Some embodiments of the invention provide a forwarding element with a data plane that is incrementally updated by the control plane of the forwarding element through direct memory access (DMA) without resetting the circuits of the data plane. FIG. 7 conceptually illustrates incremental update of data plane program in a network forwarding element 105 in some embodiments. FIG. 7 shows further details of the forwarding element 105 of FIG. 2. As shown, the data plane 130 includes a set of input buffers 710. These buffers are used to temporary store the incoming packets in order to allow the parsing circuits 230 of the ingress pipelines 220 to remove the packets from the buffer, pars the packets, and send them through the ingress pipeline. The input buffers 710 in the embodiments of FIG. 7 are used to store the incoming packets while the DMA buffers are loaded in the data plane components.

Figure 8:
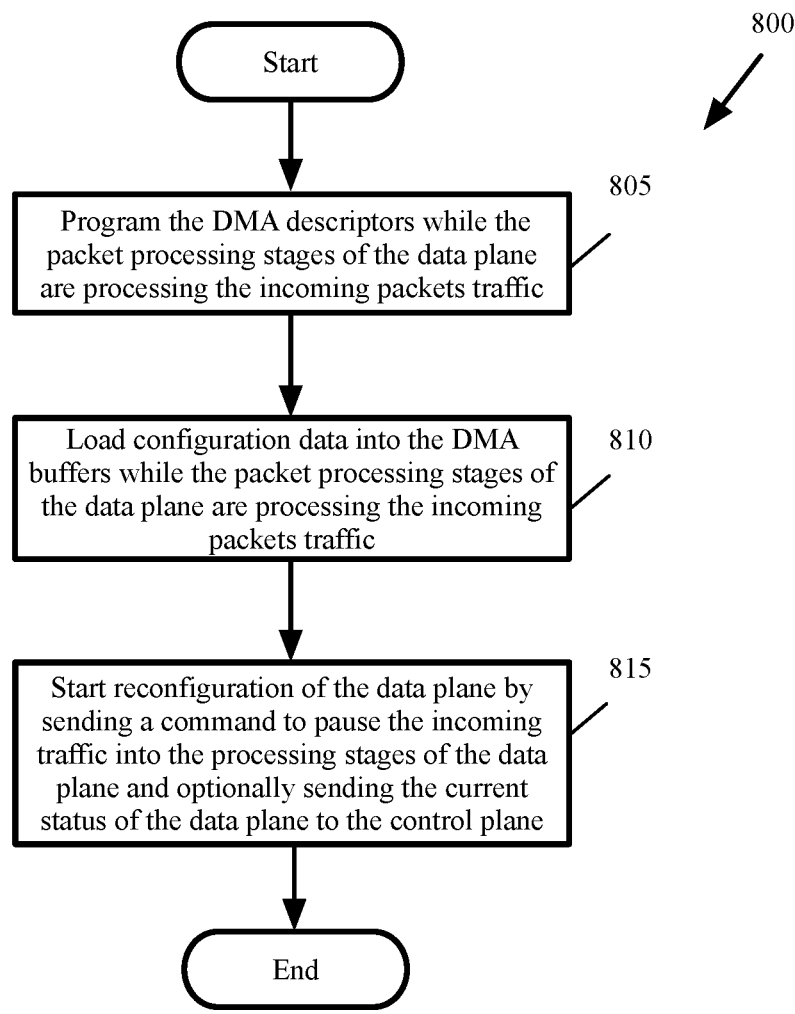
FIG. 8 conceptually illustrates a process for setting up DMA buffers to make an incremental reconfiguration of the data plane of a forwarding element in some embodiments.

FIG. 8 conceptually illustrates a process 800 for setting up DMA buffers to make an incremental reconfiguration of the data plane of a forwarding element in some embodiments. The process in some embodiments is performed by software executed by processor 292 in the control plane 115 shown in FIG. 7. As shown, the process programs (at 805) the DMA descriptors while the packet processing stages of the data plane are processing the incoming packets traffic. For instance, processor 292 programs DMA descriptors 160 shown in FIG. 7.

The process also loads (at 810) the configuration data into the DMA buffers while the packet processing stages of the data plane are processing the incoming packets traffic. For instance, the processor 292 loads configuration data into DMA buffers 215 in FIG. 7 while the ingress pipelines 220 of the data plane 130 are receiving the incoming packets and parsing circuits 230, processing stages 235, de-parsing circuits 240, and traffic manager 224 of the data plane are processing the packets. Configuration data may be received through a set of APIs 150 from a configuration interface 135 shown in FIG. 1. Configuration data may also be generated by the processor 292 or retrieved from memory 294 shown in FIG. 7.

The process then sends (at 815) a command to the data plane to halt the incoming traffic to the packet processing stages of the data plane. For instance, the control plane sends a DMA instruction to the parsing circuits of the ingress pipeline to stop receiving incoming packets and/or to pause the delivery of the incoming packets to the processing stages 235. The DMA instruction in some embodiments is programmed into a DMA descriptor, which is the first descriptor that is used to start the DMA transfer.

In some embodiments, the process also instructs (e.g., through the content of one of the DMA buffers) the data plane to send the current status of the data plane to the control plane. For instance, the process instructs the data plane to send the content of one or more registers or one or more memory locations that includes statistics and/or other status of the data plane to the control plane. The process then ends.

Some embodiments perform a delay after pausing the traffic and before loading data from DAM buffers into the data plane to allow the packets that have already entered the pipelines to be processed before commanding the DMA buffers to load the configuration data into the data plane components. Other embodiments, process the current packet in each pipeline and drop other packets in the pipeline before the DMA buffers are loaded into the data plane components. In some embodiments the delay is implemented by making a pause in the chain of descriptors after DMA instruction to halt incoming packets is loaded in the parsing circuits of the ingress pipeline of the data plane.

Figure 9:
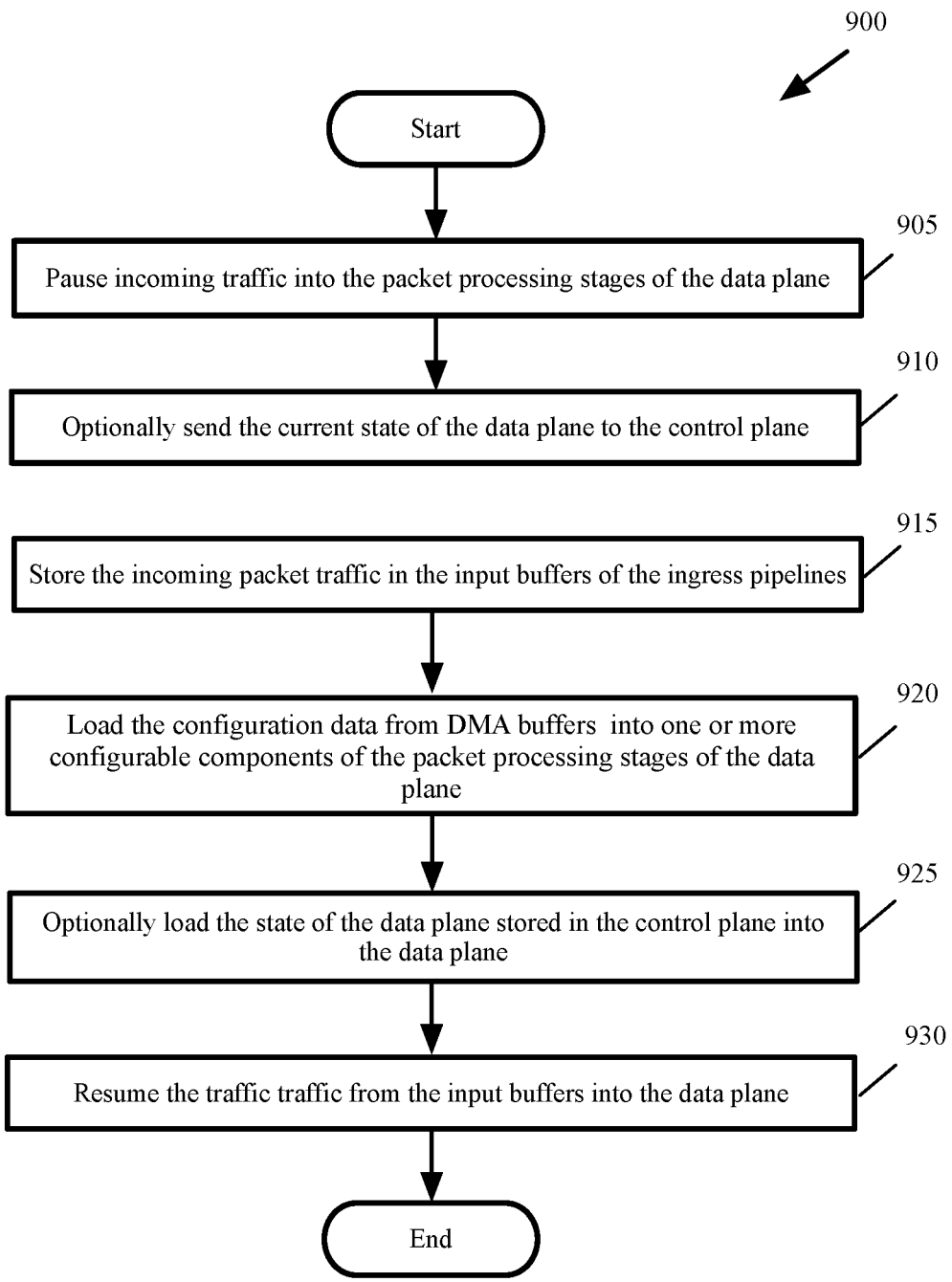
FIG. 9 conceptually illustrates a process for incremental reconfiguration of the data plane through DMA in some embodiments.

FIG. 9 conceptually illustrates a process 900 for incremental reconfiguration of data plane through DMA in some embodiments. The process in some embodiments is performed by the DMA engine 165 shown in FIG. 7 using the contents of DMA buffers transferred from the control plane into the configurable components of the data plane.

As shown, the process pauses (at 905) the incoming traffic into the packet processing stages of the data plane. For instance, as a result of receiving DMA instruction from process 700 to pause the incoming traffic, a set of instructions is loaded into parsing circuits 230 of the ingress pipeline 220 in FIG. 7 to pause receiving the incoming packets and/or to pause delivery packets to the processing stages 235 and the departing circuits 240 of the data plane.

The process also optionally sends (at 910) the current status of the data plane to the control plane. For instance, the process instructs the data plane to send the content of one or more registers or one or more memory locations that includes packet statistics, counters, and/or other status of the data plane to the control plane.

The process then stores (at 915) the incoming packet traffic in the input buffers of the ingress pipeline. For instance, the process stores the incoming packets 615 in the data buffers 710 of the ingress pipelines 220 for the duration of the incremental configuration. The process then loads (at 920) the configuration data from DMA buffers into one or more configurable components of the packet processing stages of the data plane. For instance, the process loads configuration data from the DMA buffers 125 in FIG. 7 into one or more match tables of MAU stages 270, into one or more action units of the MAU stages 270, or into one or more queues of the traffic manager 224 (e.g., to reset the queues).

When the incremental update of the data plane is completed, the process optionally loads (at 925) the state of the data plane stored in the control plane into the data plane. For instance, the content of a DMA buffer is the state of the data plane that was sent to the control plane in operation 910, above. The process then resumes (at 930) the flow of packet traffic to the packet processing stages of the data plane. For instance, the last DMA buffer transfer causes the data plane to resume receiving and processing the packets. The process then ends. Since all configurable components of the data plane are DMA accessible, the incremental reconfiguration is performed very fast and in most scenarios can be done by buffering the incoming packets and resuming processing of the packets from the input buffers with no loss of data.

Using Incremental Reconfiguration as a Primitive to Incrementally Update the Data Plane Program In some embodiments, incremental reconfiguration is used as a primitive to reprogram the data plane. An example of the need for reprogramming the data plane includes making an incrementally update to a portion of the data plane program. The packet processing stages of the forwarding element in some embodiments are programmed by a domain-specific language such as P4 (Programming Protocol-Independent Packet Processors).

A typical P4 program includes headers, parse graph, match-action tables, and control flow between tables. Each header defines the sequence and structure of a series of packet fields. The parse graph identifies the header sequences in packets. The match-action tables specify packet header fields to match and a set of corresponding actions to perform when the fields of a packet match the values in a match table. A control flow determines the order (or the priorities) of tables that are applied to a packet. Depending on the type of the program update, some or all components of the data plane may be reconfigured. The user can change the profile (e.g., the P4 program) running on the forwarding element. The new profile could be a totally different program or the same program with a few changes.

While the fast reconfiguration primitive described above can be used for loading a new program, the incremental reconfiguration primitive can be used to update the same program with few changes. During a complete reprogramming of the data plane, the role (or the personality) of different components of the processing stages of the data plane may change. For instance, the size and the function of the match action units may change. There are, therefore, scenarios that the data plane processes the packets differently before and after the configuration. In these scenarios, there is no need to buffer the incoming packets while the data plane is being reconfigured. There is also no need to save and restore the state of the data plane. In contrast, during the incremental update, the incoming packets can be buffered and processed after the completion of the incremental update.

In some of these embodiments, the incremental reconfiguration primitive is not exposed to the users of the forwarding IC chip. Instead, the primitive is used in other library functions and constructs. The hardware primitive is used to pause packet traffic into the data plane, store the incoming packets in input buffers, reconfigure the data plane components, and restart packet traffic in a short time with no impact (or minimal impact) to the incoming packet traffic.

Figure 10:
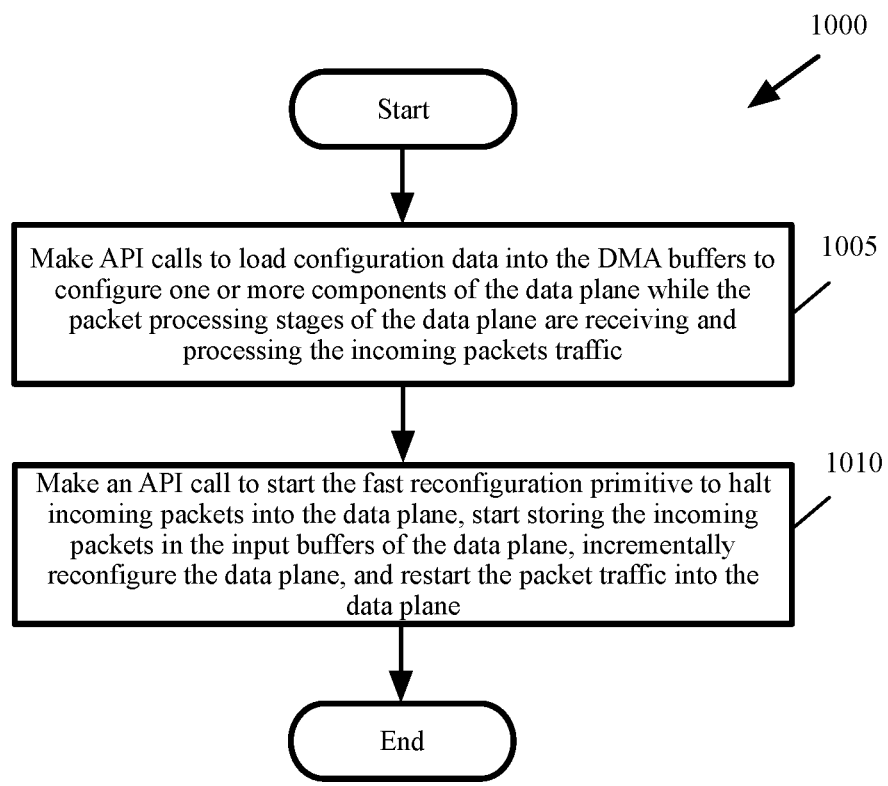
FIG. 10 conceptually illustrates a process that uses the incremental reconfiguration primitive to incrementally update the data plane program of a forwarding element in some embodiments.

FIG. 10 conceptually illustrates a process 1000 that uses the incremental reconfiguration primitive to incrementally update the data plane program in some embodiments. FIG. 10 is described by reference to FIGS. 11A-11D that conceptually illustrate incrementally reconfiguring of one or more components of the data plane of a forwarding IC in some embodiments.

Process 1000 in some embodiments is performed by an application that executes by a processor such as processor 292 in the control plane 115 of a forwarding element 105 as shown in FIGS. 11A-11D. As shown, process 1000 makes (at 1005) at least one API call to load configuration data into at least one DMA buffer to incrementally configure one or more components of the data plane while the packet processing stages of the data plane are receiving and processing the incoming packet traffic.

Figure 11A:
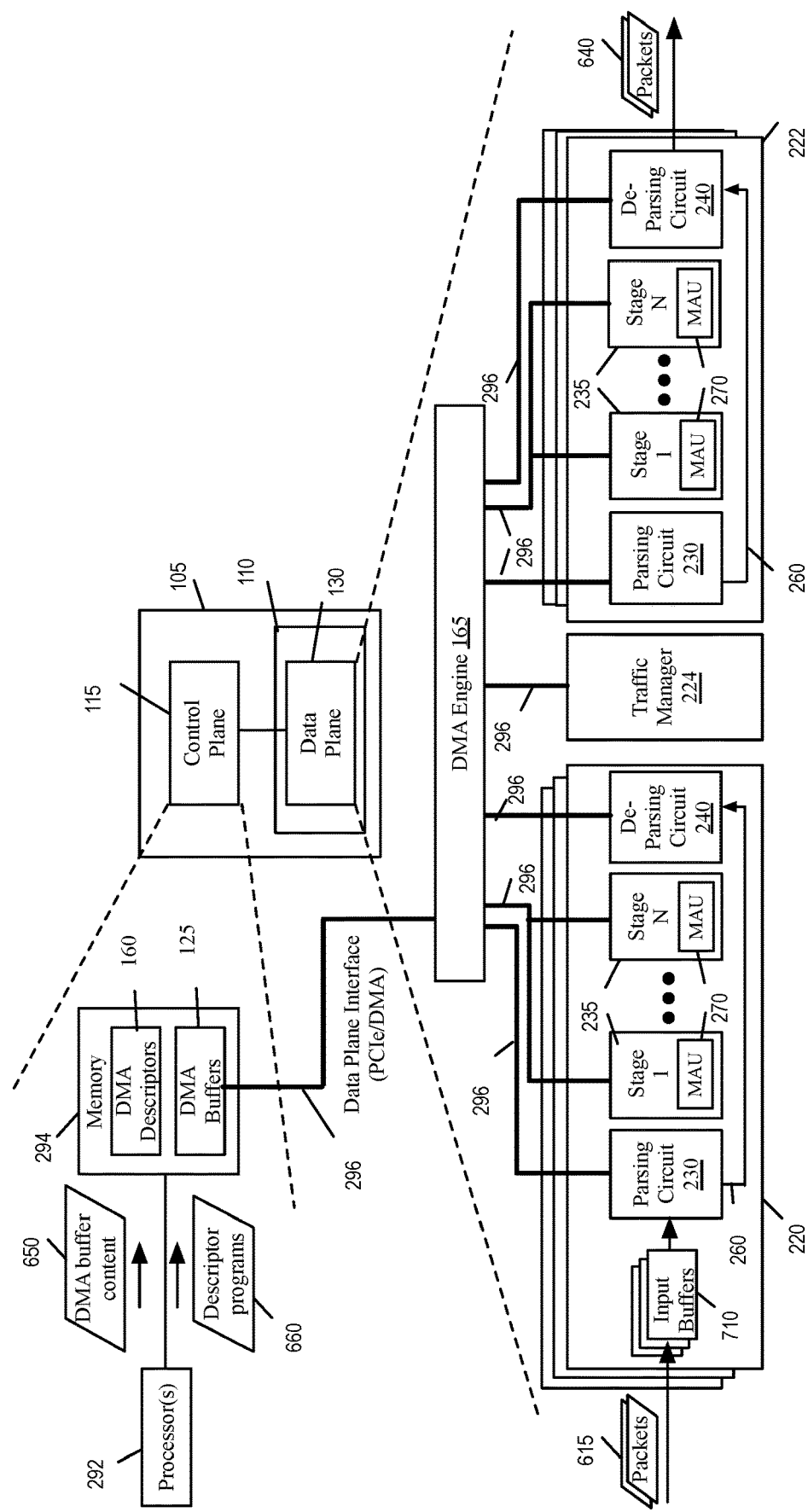
FIGS. 11A-11D conceptually illustrate incrementally reconfiguring of one or more components of the data plane of a forwarding IC in some embodiments.

As shown in FIG. 11A, an application that executes on one or more processing units (292) in the control plane makes one or more API calls to different drivers to reconfigure one or more components of the data plane. The drivers program one or more descriptors 160 (as shown by 660) and load the associated DMA buffers (as shown by 650) by content to copy into the data plane components using DMA. Since the goal of the incremental update is to make the data plane update as soon as possible, some embodiments use only one DMA buffer to load configuration data into a component of the data plane.

As shown in FIG. 11A, while one ore more descriptors 160 are programmed and the one or more DMA buffers 125 are loaded, incoming packets 615 are received at the parsing circuits 230 of the ingress pipelines 220. The output packets 640 are also sent out of the egress pipelines 222. Once the descriptors are programmed and the DMA buffers are loaded, process 1000 makes (at 1010) an API call to start the incremental reconfiguration primitive to pause incoming packets into the data plane, start storing the incoming packets in the input buffers of the data plane, incrementally reconfigure the data plane, and restart the packet traffic into the data plane.

Figure 11B:
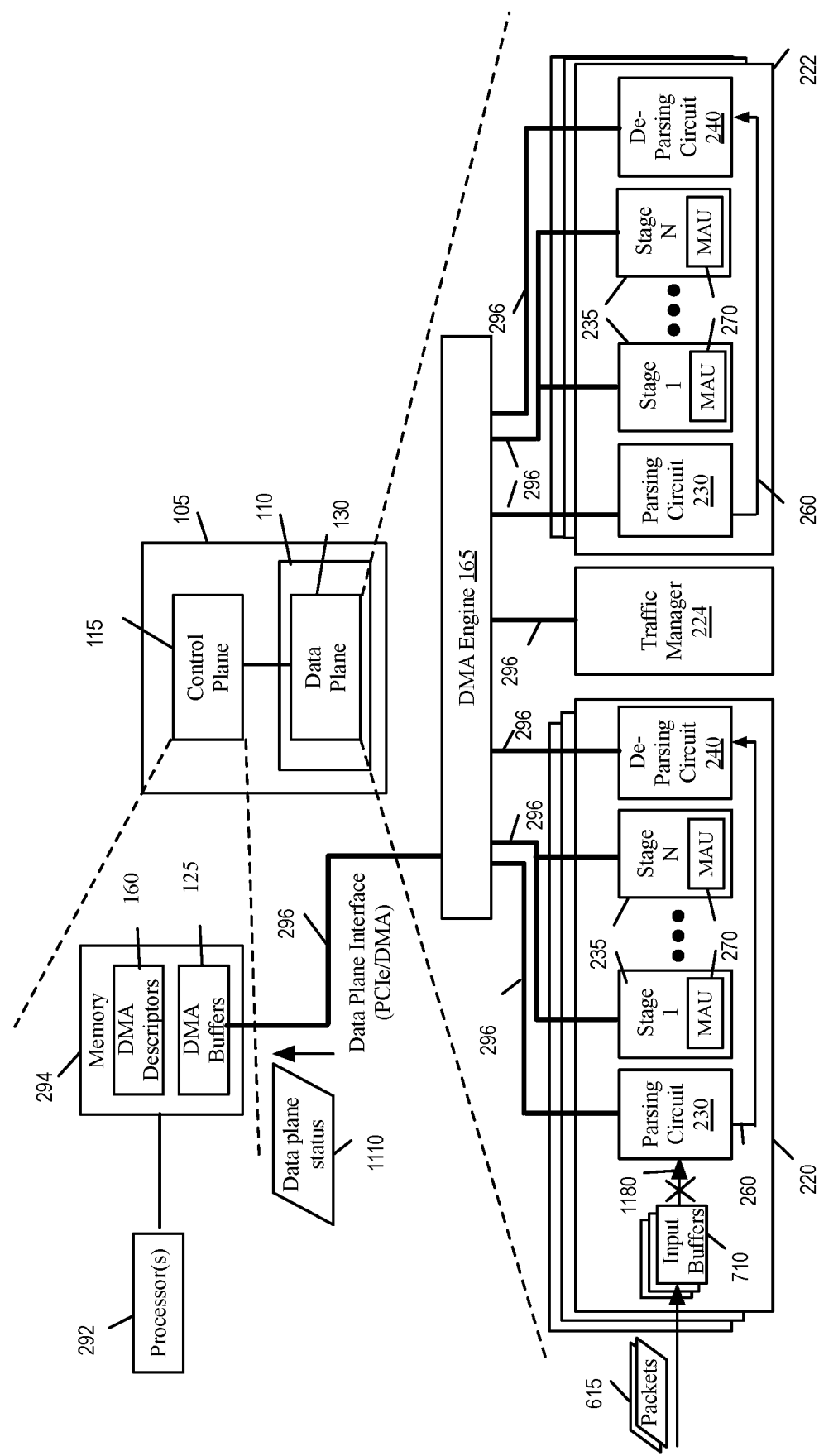

As shown in FIG. 11B, the incoming packet traffic 615 into the processing stages of the data plane is stopped (as shown by 1180). The incoming packets 615 are stored in the input buffers 710. In addition, the packets are not processed and/or sent out of the data plane egress pipelines 222 during this stage. As shown, the current status of the data plane 1110 (e.g., the content of one or more registers or one or more memory locations) is optionally sent to the control plane.

Figure 11C:
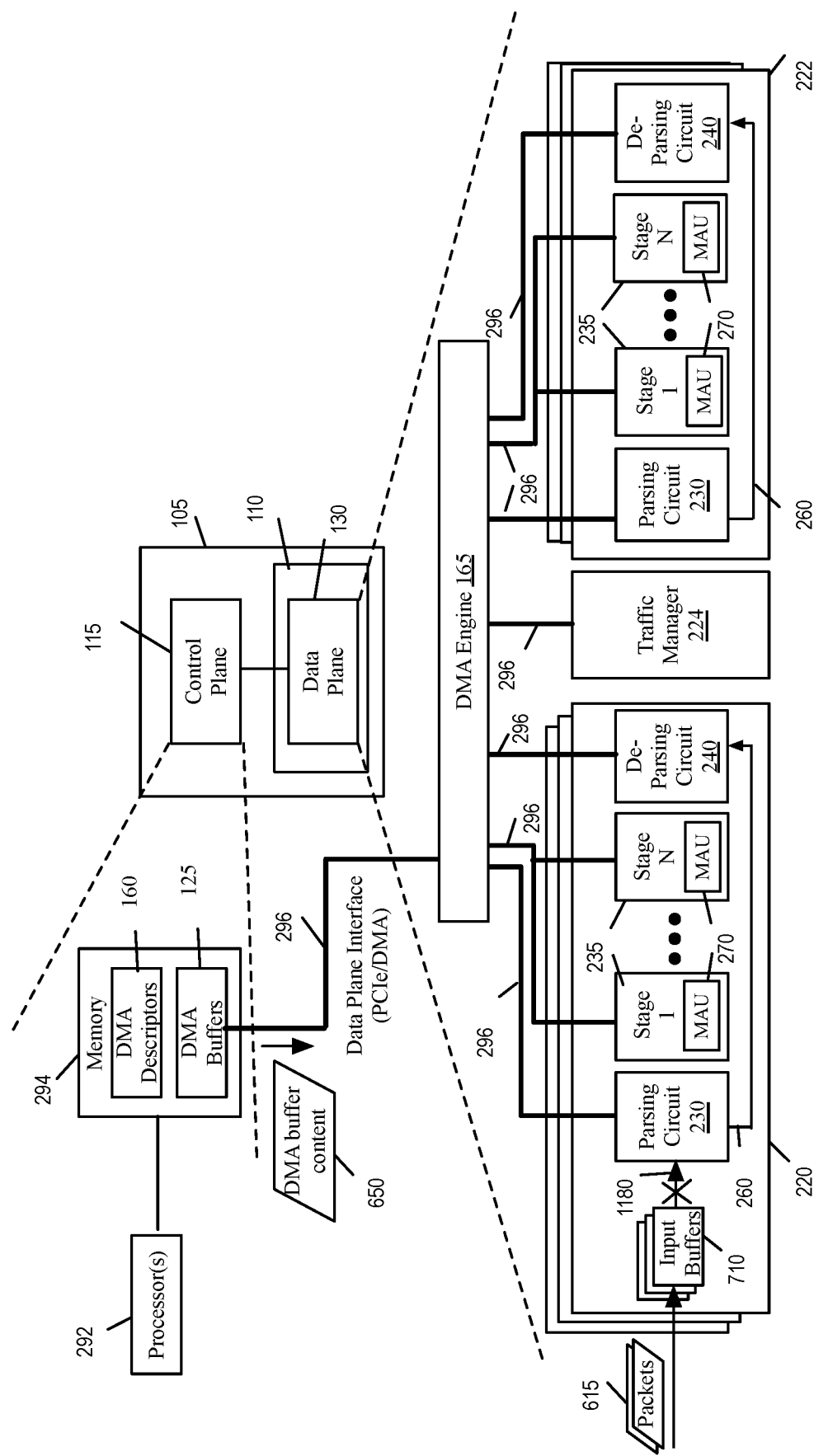

FIG. 11C shows that the contents 650 of one or more DMA buffers 125 are loaded into the data plane through the data plane interface 296 (e.g., the PCIe bus). As shown, the packets are stored in the input buffers 710. In addition, the packets are not processed and/or sent out of the data plane egress pipelines 222 during this stage. The operations of the processing units 292 of the control plane are not stopped during the incremental reconfiguration of the data plane.

As shown in FIG. 11C, the incoming packet traffic 615 into the processing stages of the data plane is stopped (as shown by 1180) while the contents 650 of one or more DMA buffers 125 are loaded into the data plane through the data plane interface 296 (e.g., the PCIe bus). As shown, the packets are stored in the input buffers 710. In addition, the packets are not processed and/or sent out of the data plane egress pipelines 222 during this stage.

Figure 11D:
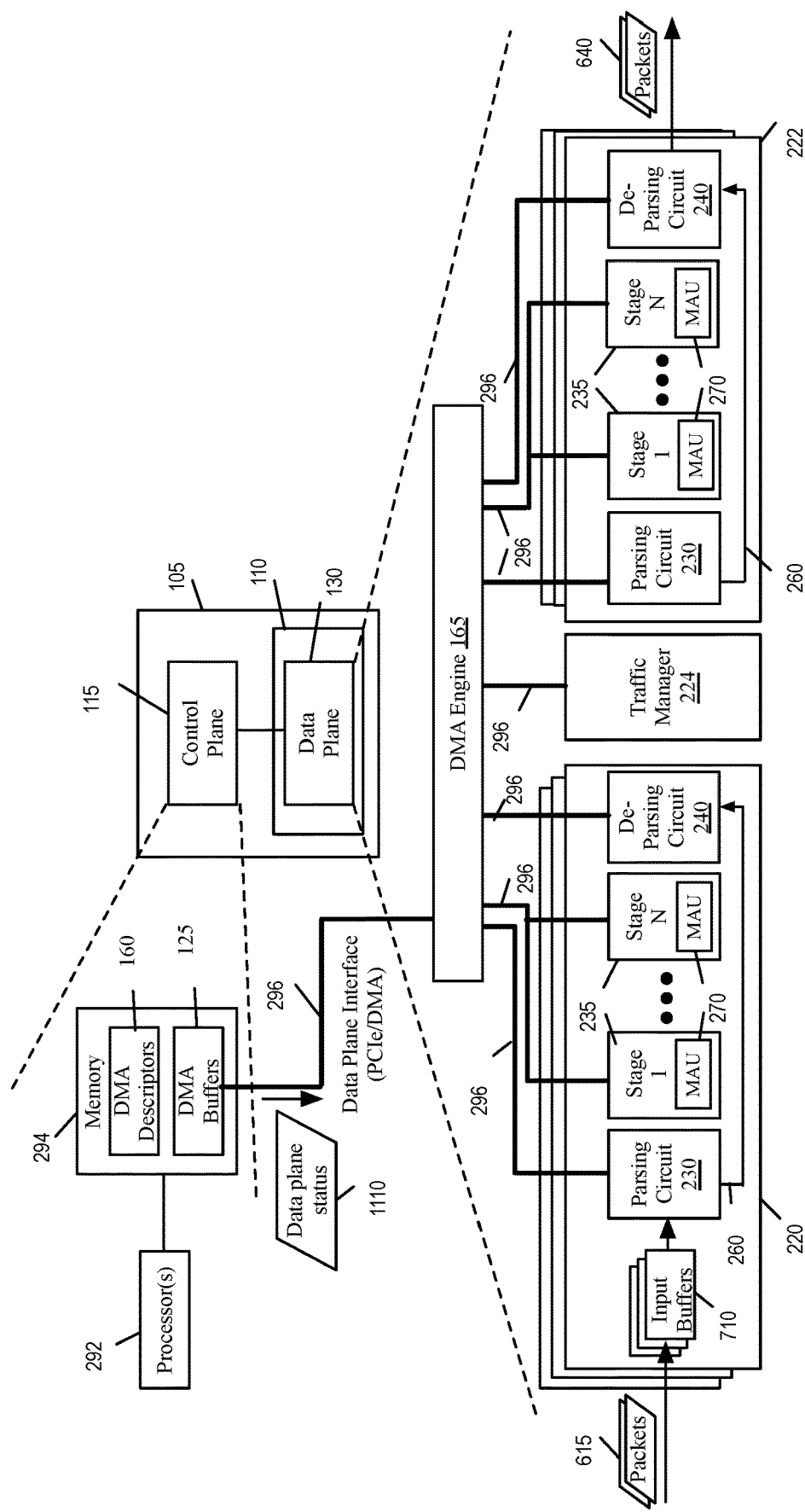

As shown in FIG. 11D, once the configuration data is loaded into the destination locations in the data plane, the previous status of the data plane 1110 is optionally loaded into the data plane. The packet traffic into the data plane is then restarted. After the configuration data is loaded into the data plane components, the parsing circuits 230 resume sending the incoming packet traffic 615 into the packet processing stages 235 of the data plane. For instance, the last DMA buffer that is loaded into the data plane is loaded into the ingress pipelines parsing circuits to enable the parsing circuits to resume sending the packets into the processing stages of the data plane. As shown, the egress pipelines 222 send the egress packets 640 out of the forwarding element 105.

III. Computer System

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
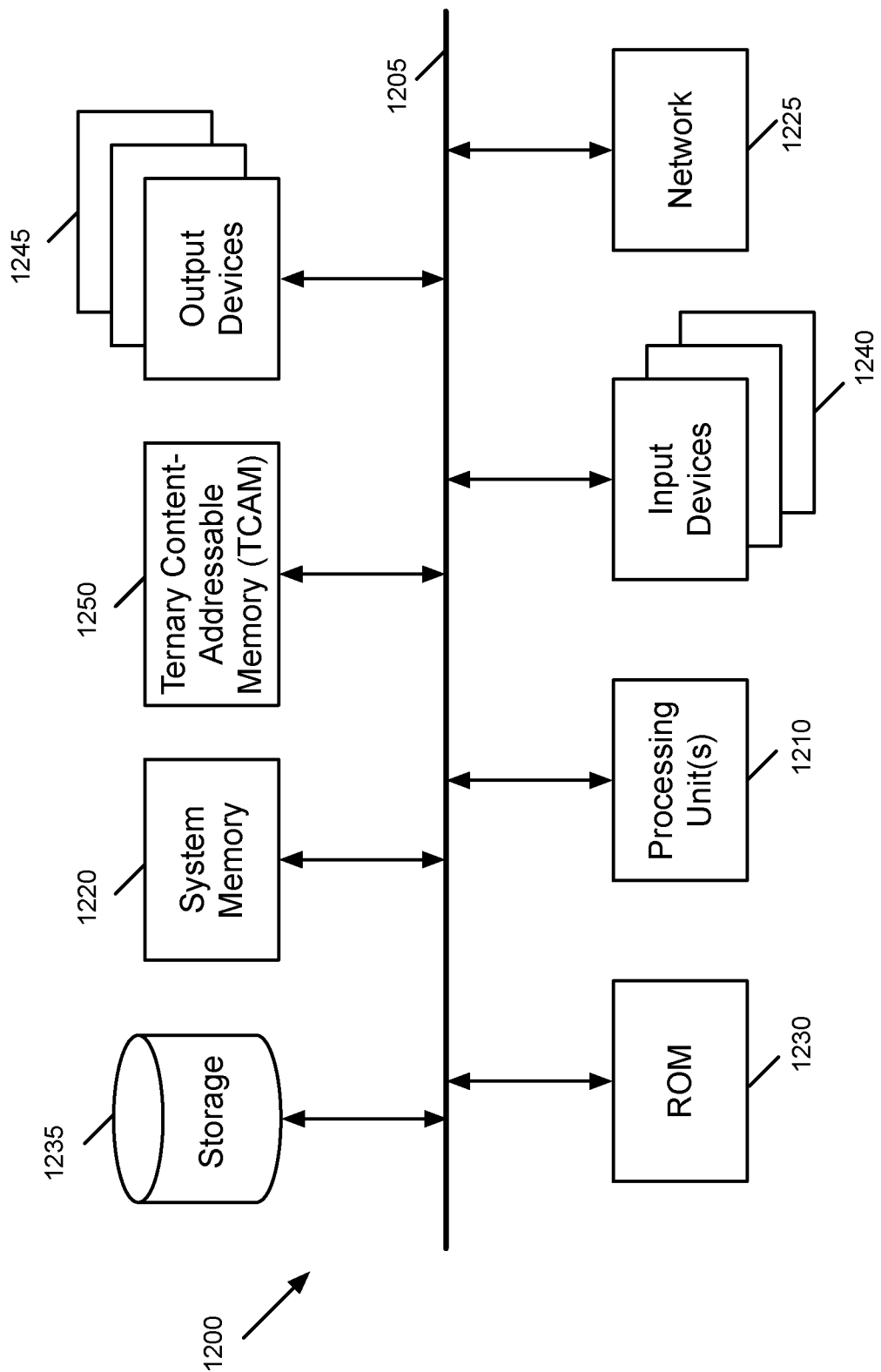
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., desktop computer, personal computer, tablet computer, server computer, mainframe, blade computer, etc.), phone, PDA, or any other sort of electronic device. Such an electronic system includes various types of computer readable media and interfaces for various other types of computer readable media. Electronic system 1200 includes a bus 1205, processing unit(s) 1210, system memory 1220, read-only memory (ROM) 1230, permanent storage device 1235, input devices 1240, output devices 1245, and TCAM 1250.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1220, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1220 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), an Intranet, or a network of networks, such as the Internet. Any or all components of electronic system 1200 may be used in conjunction with the invention.

Some embodiments include electronic components, such as microprocessors, storage, and memory, which store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. Accordingly, one of ordinary skill in the art would understand that the invention is not to be limited by the foregoing illustrative details, but rather is to be defined by the appended claims.

The invention claimed is:

1. A network forwarding element comprising:
a set of data plane circuits comprising a plurality of configurable packet processing stages comprising (i) a set of ingress pipelines, (ii) a set of egress pipelines, and (iii) a traffic management stage between the ingress and egress pipelines, the configurable packet processing stages to receive and process incoming packet traffic received by the network forwarding element; and
a set of control plane circuits comprising a set of direct memory access (DMA) buffers to configure the configurable packet processing stages of the set of data plane circuits, the set of control plane circuits configured to:
load configuration data to reconfigure the configurable packet processing stages into the set of DMA buffers while the configurable packet processing stages process the incoming packet traffic;
pause the incoming packet traffic to the configurable packet processing stages;
load the configuration data from the DMA buffers into the configurable packet processing stages, wherein the configurable packet processing stages are configured to process and transmit all packets inside the configurable packet processing stages after the incoming packet traffic to the configurable packet processing stages are paused and prior to loading the configuration data from the DMA buffers into the configurable packet processing stages; and
resume incoming packet traffic to the configurable packet processing stages.

2. The network forwarding element of claim 1, wherein at least one of the set of ingress pipelines, at least one of the set of egress pipelines, and the traffic management stage comprise one or more memory units, wherein load the configuration data from the DMA buffers into the configurable packet processing stages comprises reprogram a content of one or more memory units.

3. The network forwarding element of claim 1, wherein pause the incoming packet traffic to the configurable packet processing stages comprises pause a delivery of the incoming packet traffic to the ingress pipelines of the set of data plane circuits.

4. The network forwarding element of claim 1, wherein the set of control plane circuits comprises a processing unit and an input output interface, wherein operations of the processing unit and the input output interface are not stopped during the reconfiguration of the set of data plane circuits.

5. A network forwarding element comprising:
a set of data plane circuits comprising a plurality of configurable packet processing stages comprising (i) a set of ingress pipelines, (ii) a set of egress pipelines, and (iii) a traffic management stage between the ingress and egress processing pipelines, the configurable packet processing stages to receive and process incoming packet traffic received by the network forwarding element; and
a set of control plane circuits comprising a set of direct memory access (DMA) buffers to configure the configurable packet processing stages of the set of data plane circuits, the set of control plane circuits configured to:
load configuration data to reconfigure the configurable packet processing stages into the set of DMA buffers while the configurable packet processing stages process the incoming packet traffic;
pause the incoming packet traffic to the configurable packet processing stages, wherein at least one egress pipeline in the set of egress pipelines is configured to transmit any current packet ready for transmission in a pipeline after the incoming packet traffic to the configurable packet processing stages is paused, wherein the configurable packet processing stages are configured to drop a packet not ready for transmission inside the configurable packet processing stages after the current packet is transmitted from the at least one egress pipeline;
load the configuration data from the DMA buffers into the configurable packet processing stages; and
resume incoming packet traffic to the configurable packet processing stages.

6. A network forwarding element comprising:
a set of data plane circuits comprising a plurality of configurable packet processing stages comprising (i) a set of ingress processing pipelines, (ii) a set of egress processing pipelines, and (iii) a traffic management stage between the ingress and egress processing pipelines, the configurable packet processing stages to receive and process incoming packet traffic to the network forwarding element, wherein at least one ingress and egress pipeline comprises a set of tables, at least one table to specify (i) a set of match values for matching a set of header fields of the incoming packet traffic and (ii) a set of actions to perform on a packet matching the set of match values corresponding to the set of actions; and a set of control plane circuits comprising a set of direct memory access (DMA) buffers to configure the configurable packet processing stages of the set of data plane circuits, the set of control plane circuits configured to:

load configuration data to reconfigure the configurable packet processing stages into the set of DMA buffers while the configurable packet processing stages process the incoming packet traffic;

pause the incoming packet traffic to the configurable packet processing stages;

load the configuration data from the DMA buffers into the configurable packet processing stages, wherein the configuration data changes at least one of the set of match values to match to the set of header fields of the incoming packet traffic and the set of actions to perform on matching set of header fields of the incoming packet traffic for at least one table in at least one configurable packet processing stage of the network forwarding element; and resume incoming packet traffic to the configurable packet processing stages.

7. A network forwarding element comprising:
a set of data plane circuits comprising a plurality of configurable packet processing stages comprising (i) a set of ingress processing pipelines, (ii) a set of egress processing pipelines, and (iii) a traffic management stage between the ingress and egress processing pipelines, the configurable packet processing stages to receive and process incoming packet traffic to the network forwarding element; and a set of control plane circuits comprising a set of direct memory access (DMA) buffers to configure the configurable packet processing stages of the set of data plane circuits, the set of control plane circuits configured to:

load configuration data to reconfigure the configurable packet processing stages into the set of DMA buffers while the configurable packet processing stages process the incoming packet traffic;

pause the incoming packet traffic to the configurable packet processing stages;

disable the traffic management stage, the ingress processing pipelines, and the egress processing pipelines of the set of data plane circuits after disablement of the traffic management stage, the ingress processing pipelines, and the egress processing pipelines of the set of data plane circuits, load the configuration data from the DMA buffers into the configurable packet processing stages;

enable the traffic management stage, the ingress processing pipelines, and the egress processing pipelines of the set of data plane circuits after loading the configuration data from the DMA buffers into the configurable packet processing stages; and resume incoming packet traffic to the configurable packet processing stages.

8. A method of reconfiguring a network forwarding element comprising a set of data plane circuits and a set of control plane circuits, the set of data plane circuits comprising a plurality of configurable packet processing stages comprising (i) a set of ingress pipelines, (ii) a set of egress pipelines, and (iii) a traffic management stage between the ingress and egress processing pipelines, the configurable packet processing stages for receiving and processing incoming packet traffic received by the network forwarding element, the set of control plane circuits comprising a set of direct memory access (DMA) buffers for configuring the configurable packet processing stages of the set of data plane circuits, the method comprising:

loading configuration data for reconfiguring the configurable packet processing stages from the control plane circuits into the set of DMA buffers while the configurable packet processing stages are processing the incoming packet traffic;

pausing the incoming packet traffic to the configurable packet processing stages by the control plane circuits;

processing and transmitting all packets inside the packet processing stages;

loading the configuration data from the DMA buffers into the configurable packet processing stages; and resuming incoming packet traffic to the configurable packet processing stages by the control plane circuits.

9. The method of claim 8, wherein at least one of the set of ingress pipelines, at least one of the set of egress pipelines, and the traffic management stage comprises one or more memory units, wherein loading the configuration data from the DMA buffers into the configurable packet processing stages comprises reprogramming a content of one or more memory units.

10. The method of claim 8, wherein pausing the incoming packet traffic to the configurable packet processing stages comprises pausing a delivery of the incoming packet traffic to the ingress pipelines of the set of data plane circuits.

11. The method of claim 8, wherein the control plane circuits comprise a processing unit and an input output interface, wherein operations of the processing unit and the input output interface are not stopped during the reconfiguration of the set of data plane circuits.

12. A method of reconfiguring a network forwarding element comprising a set of data plane circuits and a set of control plane circuits, the set of data plane circuits comprising a plurality of configurable packet processing stages comprising (i) a set of ingress pipelines, (ii) a set of egress pipelines, and (iii) a traffic management stage between the ingress and egress processing pipelines, the configurable packet processing stages for receiving and processing incoming packet traffic received by the network forwarding element, the set of control plane circuits comprising a set of direct memory access (DMA) buffers for configuring the configurable packet processing stages of the set of data plane circuits, the method comprising:

loading configuration data for reconfiguring the configurable packet processing stages from the control plane circuits into the set of DMA buffers while the configurable packet processing stages are processing the incoming packet traffic;

pausing the incoming packet traffic to the configurable packet processing stages by the control plane circuits;

transmitting any current packet ready for transmission in each egress pipeline after the incoming packet traffic to the configurable packet processing stages is paused; and dropping packets that are not ready for transmission inside the configurable packet processing stages after a current packet is transmitted from each egress pipeline;

loading the configuration data from the DMA buffers into the configurable packet processing stages; and resuming incoming packet traffic to the configurable packet processing stages by the control plane circuits.

13. A method for reconfiguring a network forwarding element comprising a set of data plane circuits and a set of control plane circuits, the set of data plane circuits comprising a plurality of configurable packet processing stages comprising (i) a set of ingress pipelines, (ii) a set of egress pipelines, and (iii) a traffic management stage between the ingress and egress processing pipelines, the configurable packet processing stages for receiving and processing incoming packet traffic to the network forwarding element, wherein each ingress and egress pipeline comprises a set of tables, each table specifying (i) a set of match values for matching a set of header fields of the incoming packet traffic and (ii) a set of actions to perform on a packet matching the set of match values corresponding to the set of actions, the set of control plane circuits comprising a set of direct memory access (DMA) buffers for configuring the configurable packet processing stages of the set of data plane circuits, the method comprising:

loading configuration data for reconfiguring the configurable packet processing stages from the control plane circuits into the set of DMA buffers while the configurable packet processing stages are processing the incoming packet traffic;

pausing the incoming packet traffic to the configurable packet processing stages by the control plane circuits;

loading the configuration data from the DMA buffers into the configurable packet processing stages, wherein the configuration data changes at least one of the set of match values for matching to the set of header fields of the incoming packet traffic, and the set of actions to perform on the matching of the set of header fields of the incoming packet traffic for at least one table in at least one configurable packet processing stage of the network forwarding element; and resuming incoming packet traffic to the configurable packet processing stages by the control plane circuits.

14. A method for reconfiguring a network forwarding element comprising a set of data plane circuits and a set of control plane circuits, the set of data plane circuits comprising a plurality of configurable packet processing stages comprising (i) a set of ingress pipelines, (ii) a set of egress pipelines, and (iii) a traffic management stage between the ingress and egress processing pipelines, the configurable packet processing stages for receiving and processing incoming packet traffic received by the network forwarding element, the set of control plane circuits comprising a set of direct memory access (DMA) buffers for configuring the configurable packet processing stages of the set of data plane circuits, the method comprising:

loading configuration data for reconfiguring the configurable packet processing stages from the control plane circuits into the set of DMA buffers while the configurable packet processing stages are processing the incoming packet traffic;

pausing the incoming packet traffic to the configurable packet processing stages by the control plane circuits;

disabling the traffic management stage, the ingress pipelines, and the egress pipelines of the set of data plane circuits by the control plane circuits after disabling the traffic management stage, the ingress pipelines, and the egress processing pipelines of the set of data plane circuits, loading the configuration data from the DMA buffers into the configurable packet processing stages;

enabling the traffic management stage, the ingress pipelines, and the egress pipelines of the set of data plane circuits by the control plane circuits after loading the configuration data from the DMA buffers into the configurable packet processing stages; and resuming incoming packet traffic to the configurable packet processing stages by the control plane circuits.

15. An apparatus comprising:

at least one configurable data plane packet processing stage and a control plane controller comprising a set of buffers to configure at least one data plane configurable packet processing stage, the control plane controller to:

load configuration data into a set of buffers to reconfigure a configurable data plane packet processing stage while the configurable data plane packet processing stage processes incoming packet traffic;

pause the incoming packet traffic to the configurable data plane packet processing stage; and load the configuration data from the buffers into the configurable data plane packet processing stage, wherein:

the at least one configurable data plane packet processing stage comprises a set of tables, wherein a table is to specify (i) a set of match values for matching a set of header fields of the incoming packet traffic and (ii) a set of actions to perform on a packet having a set of header fields that matches the set of match values corresponding to the set of actions and for at least one table, the configuration data is to change at least one of the set of match values for matches of the set of header fields of the incoming packet traffic and the set of actions to perform on matching incoming packet traffic; and resume incoming packet traffic to the at least one configurable data plane packet processing stage.

16. The apparatus of claim 15, wherein the at least one configurable data plane packet processing stage comprises: (i) at least one ingress pipeline, (ii) at least one egress pipeline, and (iii) a traffic manager and the at least one configurable data plane packet processing stage is to receive and process incoming packet traffic.

17. The apparatus of claim 16, wherein the control plane controller is configured to:

disable the traffic manager, the at least one ingress pipeline, and the at least one egress pipeline;

after disablement of the traffic manager, the at least one ingress pipeline, and the at least one egress pipeline, load the configuration data from the buffers into the configurable data plane packet processing stage; and enable the traffic manager, the at least one ingress pipeline, and the at least one egress pipeline after loading the configuration data from the buffers into the configurable data plane packet processing stage.

18. The apparatus of claim 15, wherein the configurable data plane packet processing stage is configured to process and transmit packets after the incoming packet traffic to the configurable data plane packet processing stage are paused and prior to loading the configuration data from the buffers into the configurable data plane packet processing stage.

19. The apparatus of claim 15, wherein the configurable data plane packet processing stage is configured to transmit any current packet ready for transmission after the incoming packet traffic to the configurable data plane packet processing stage is paused and drop any packet not ready for transmission inside the configurable data plane packet processing stage after the current packet is transmitted from the configurable data plane packet processing stage.

* * * * *